US012475871B2

(12) United States Patent
Nagata et al.

(10) Patent No.: US 12,475,871 B2
(45) Date of Patent: Nov. 18, 2025

(54) ARPEGGIATOR, RECORDING MEDIUM AND METHOD OF MAKING ARPEGGIO

(71) Applicant: Roland Corporation, Shizuoka (JP)

(72) Inventors: Akihiro Nagata, Shizuoka (JP); Takaaki Hagino, Shizuoka (JP)

(73) Assignee: Roland Corporation, Shizuoka (JP)

( * ) Notice: Subject to any disclaimer, the term of this patent is extended or adjusted under 35 U.S.C. 154(b) by 812 days.

(21) Appl. No.: 17/639,594

(22) PCT Filed: Sep. 4, 2019

(86) PCT No.: PCT/JP2019/034872
§ 371 (c)(1),
(2) Date: Mar. 2, 2022

(87) PCT Pub. No.: WO2021/044561
PCT Pub. Date: Mar. 11, 2021

(65) Prior Publication Data
US 2022/0335916 A1 Oct. 20, 2022

(51) Int. Cl.
*G10H 1/28* (2006.01)
*G10H 1/00* (2006.01)

(52) U.S. Cl.
CPC ............. *G10H 1/28* (2013.01); *G10H 1/0025* (2013.01); *G10H 2210/111* (2013.01); *G10H 2210/185* (2013.01)

(58) Field of Classification Search
CPC .. G10H 1/28; G10H 1/0025; G10H 2210/111; G10H 2210/185
See application file for complete search history.

(56) References Cited

U.S. PATENT DOCUMENTS 4,354,413 A 10/1982 Suzuki et al.
6,051,771 A 4/2000 Iizuka
2006/0016323 A1 1/2006 Hayakawa

FOREIGN PATENT DOCUMENTS

JP S53106020 9/1978
JP H09292889 11/1997
JP H11126074 5/1999
(Continued)

OTHER PUBLICATIONS https://www.reddit.com/r/ableton/comments/5ji2br/comment/dbgd5kl/, posted Dec. 20, 2016; retrieved Nov. 13, 2024 (Year: 2016).*
(Continued)

*Primary Examiner* — Jeffrey Donels
*Assistant Examiner* — Philip G Scoles
(74) *Attorney, Agent, or Firm* — JCIPRNET

(57) ABSTRACT

In a synthesizer 1, the highest note number is set from the allowed Oct width and the lowest note number of a sound production part in a setting table 11*e*, and if the note number of an Arp note memory 12*b* is not between the lowest note number and the highest note number, the note number of one octave unit is added to or subtracted from the note number of the Arp note memory 12*b*. Consequently, the note number of the Arp note memory 12*b* is corrected to the pitch range between the lowest note number and the highest note number, and thus can be corrected to the sound production pitch range of the timbre of the sound production part, and arpeggios can be outputted using sounds that are more appropriate for an instrument of said timbre.

8 Claims, 14 Drawing Sheets

(56) References Cited

FOREIGN PATENT DOCUMENTS

| | | | | |
|---|---|---|---|---|
| JP | 2008102349 | | | 5/2008 |
| JP | 2008102349 | A | * | 5/2008 |

OTHER PUBLICATIONS

Arpache 5 Overview (https://archive.steinberg.help/cubase_nuendo_plugin_reference/v8/en/_shared/topics/plug_ref/arpache_5/arpache_5_overview_r.html, Copyright 2017, retrieved May 4, 2025) (Year: 2017).*

"Search Report of Europe Counterpart Application", issued on Apr. 12, 2023, p. 1-p. 8.

"Written Opinion of the International Searching Authority (Form PCT/ISA/237) of PCT/JP2019/034872," mailed on Nov. 12, 2019, with English translation thereof, pp. 1-6.

"Notice of Allowance of Japan Counterpart Application," issued on Nov. 22, 2022, p. 1-p. 5, with English translation thereof.

"International Search Report (Form PCT/ISA/210) of PCT/JP2019/034872," mailed on Nov. 12, 2019, with English translation thereof, pp. 1-2.

* cited by examiner

| No. | TIMBRE |
|---|---|
| 1 | PIANO |
| 2 | BASS |
| 3 | DRUM |
| : | : |

| NOTE NUMBER | STATE | CHANGE TIME |
|---|---|---|
| 0 | ON | 12:34:56. 78912 |
| 1 | OFF | 12:34:56. 80345 |
| 2 | ON | 12:34:57. 10067 |
| : | : | : |

Arp PATTERN TABLE 11d

| No. | Arp PATTERN |
|---|---|
| 1 | A1 |
| 2 | A2 |
| 3 | A3 |
| : | : |

(a)

Arp PATTERN A1

| NOTE NUMBER | NUMBER OF STEPS | | | | | | | |
|---|---|---|---|---|---|---|---|---|
| | 0 | 1 | 2 | 3 | 4 | 5 | 6 | 7 |
| A | | | ○ | | | | ○ | |
| B | ○ | ○ | ○ | ○ | ○ | ○ | ○ | ○ |
| C | | | | ○ | | | | ○ |

(b)

SETTING TABLE 11e

| SETTING ITEM \ PART | RHYTHM PART | BASS PART | DRUM PART |
|---|---|---|---|
| TIMBRE | PIANO | BASS | DRUM |
| Arp PATTERN | A1 | A2 | A4 |
| STEP Tick | 48 | 24 | 12 |
| REMAIN TABLE | R1 | R2 | R3 |
| MAXIMUM NUMBER OF NOTES | 3 | 2 | 1 |
| KEY PRESS MODE | SINGLE | CHORD | SINGLE |
| INITIAL VELOCITY | 100 | 80 | 70 |
| KEY RANGE CHANGE FUNCTION | OFF | ON | OFF |
| LOWEST NOTE NUMBER | – | 30 | 30 |
| ALLOWABLE Oct WIDTH | – | 2 | 1 |
| Oct SHIFT FUNCTION | ON | OFF | ON |
| Oct SHIFT WIDTH | 2 | – | 1 |
| Oct RESET FUNCTION | OFF | OFF | ON |
| DUCK FUNCTION | ON | ON | OFF |
| DUCK PART | DRUM PART | DRUM PART | – |
| DUCK NOTE | 50 | ANY | – |
| DUCK RATE | 50 | 100 | – |

(c)

REMAIN TABLE R1

| No. | NOTE NUMBER | ACQUISITION TIME |
|---|---|---|
| 1 | 55 | 13:56:00. 50102 |
| 2 | 60 | 13:56:00. 60203 |
| 3 | 70 | 13:56:00. 70304 |
| : | : | : |

(d)

FIG. 3

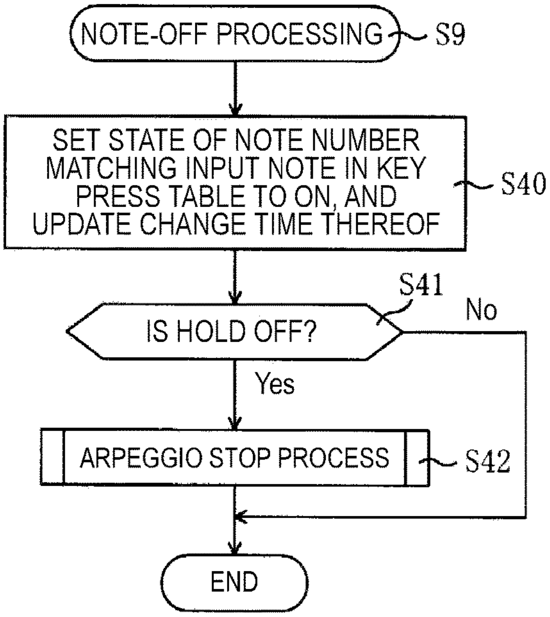
(a)
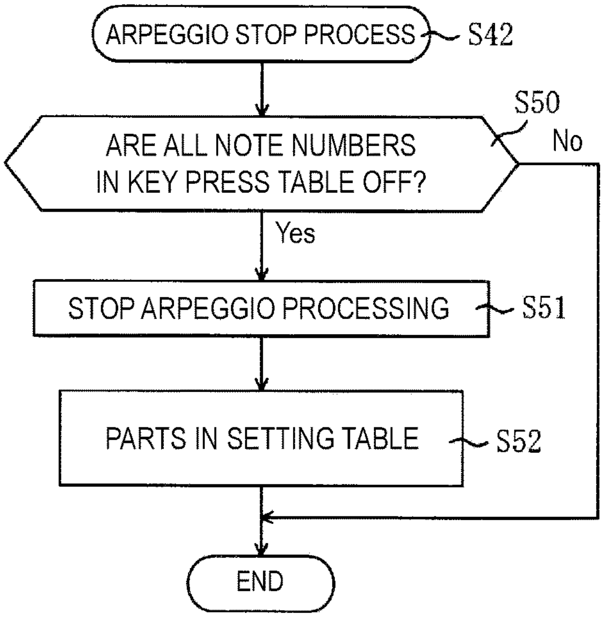
(b)
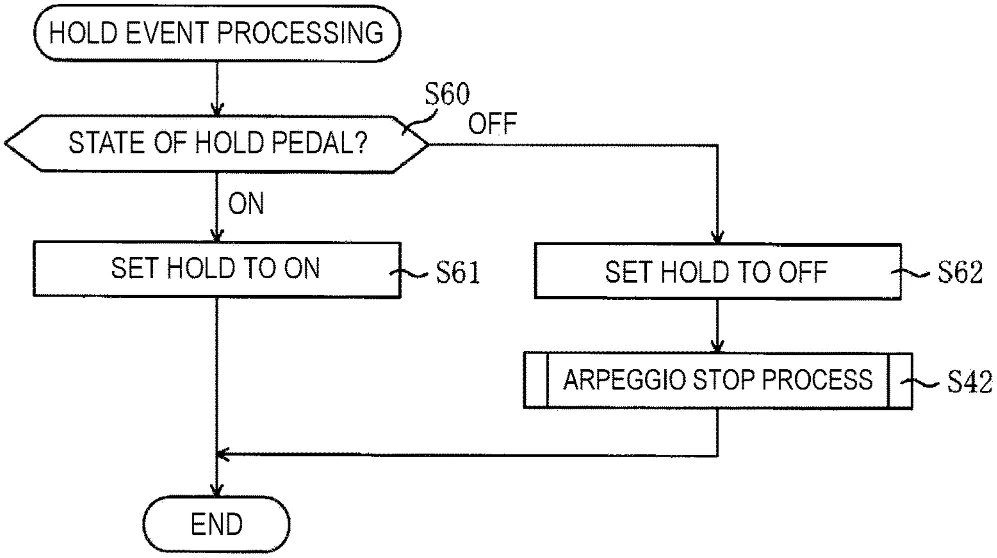
(c)
FIG. 6

| NOTE NUMBER | NUMBER OF STEPS | | | |
|---|---|---|---|---|
| | 0 | 1 | 0 | 1 |
| 50 | ○ | | ○ | |
| 60 | | ○ | | ○ |

(a)

| NOTE NUMBER | NUMBER OF STEPS | | | | | | | |
|---|---|---|---|---|---|---|---|---|
| | 0 | 1 | 2 | 3 | 0 | 1 | 2 | 3 |
| 60 | | | ○ | | | | ○ | |
| 65 | ○ | ○ | ○ | ○ | ○ | ○ | ○ | ○ |
| 69 | | | | ○ | | | | ○ |

(b)

| NOTE NUMBER | NUMBER OF STEPS | | | | | | | | | | | | | | | |
|---|---|---|---|---|---|---|---|---|---|---|---|---|---|---|---|---|
| | 0 | 1 | 2 | 3 | 4 | 5 | 6 | 7 | 0 | 1 | 2 | 3 | 4 | 5 | 6 | 7 |
| 58 | ○ | ○ | ○ | | | | | | ○ | ○ | ○ | | | | | |
| 71 | | | | ○ | ○ | ○ | | | | | | ○ | ○ | ○ | | |
| 72 | | | | | | | ○ | ○ | | | | | | | ○ | ○ |

(c)

| NOTE NUMBER | NUMBER OF STEPS | | | |
|---|---|---|---|---|
| | 0 | 1 | 0 | 1 |
| 50 | 100 | | 100 | |
| 60 | | 100 | | 100 |

(d)

| NOTE NUMBER | NUMBER OF STEPS | | | | | | | |
|---|---|---|---|---|---|---|---|---|
| | 0 | 1 | 2 | 3 | 0 | 1 | 2 | 3 |
| 60 | | | 100 | | | | 100 | |
| 65 | 50 | 100 | 100 | 100 | 50 | 100 | 100 | 100 |
| 69 | | | | 100 | | | | 100 |

(e)

| NOTE NUMBER | NUMBER OF STEPS | | | | | | | | | | | | | | | |
|---|---|---|---|---|---|---|---|---|---|---|---|---|---|---|---|---|
| | 0 | 1 | 2 | 3 | 4 | 5 | 6 | 7 | 0 | 1 | 2 | 3 | 4 | 5 | 6 | 7 |
| 58 | 0 | 100 | 100 | | | | | | 0 | 100 | 100 | | | | | |
| 71 | | | | 100 | 0 | 100 | | | | | | 100 | 0 | 100 | | |
| 72 | | | | | | | 100 | 100 | | | | | | | 100 | 100 |

(f)

FIG. 13

ARPEGGIATOR, RECORDING MEDIUM AND METHOD OF MAKING ARPEGGIO

CROSS-REFERENCE TO RELATED APPLICATION

This application is a 371 application of the International PCT application serial no. PCT/JP2019/034872, filed on Sep. 4, 2019. The entirety of the above-mentioned patent application is hereby incorporated by reference herein and made a part of this specification.

TECHNICAL FIELD

The present invention relates to an arpeggiator, a recording medium recording a program equipped with a function thereof and a method of making an arpeggio.

BACKGROUND ART

An arpeggio production device disclosed in Patent Literature 1 stores a plurality of arpeggio patterns and a plurality of groove patterns, selects two arpeggio patterns, and selects a groove pattern in association with each of the arpeggio patterns. A timing and other data of each arpeggio pattern is changed by the corresponding groove pattern and stored as a first arpeggio pattern and a second arpeggio pattern. An arpeggio key area is set for a keyboard, a pitch is determined on the basis of a note number corresponding to a key number of a key pressed in the arpeggio key area, and two arpeggio musical sounds are produced. Consequently, since a plurality of types of arpeggio effects can be obtained at the same time, expressive arpeggio sounds are produced, and thus it is possible to enjoy playing a variety of musical sounds.

However, since the arpeggio production device in Patent Literature 1 only outputs an arpeggio sound according to pitch information of a key being pressed, in a case of timbre having a limited musical sounding range such as bass timbre, the sound may be produced with timbre that is not musically suitable depending on a key press range. In that case, the musicality may be impaired.

CITATION LIST

Patent Literature

[Patent Literature 1]
Japanese Patent Laid-Open No. 11-126074

SUMMARY OF INVENTION

The present invention has been made to solve the above problems, and an objective thereof is to provide an arpeggiator capable of playing an arpeggio in a musical sound production range corresponding to timbre, a recording medium recording a program equipped with a function thereof and a method of making an arpeggio.

Solution to Problem

In order to achieve this objective, according to the present invention, there is provided an arpeggiator that includes automatic performance part having an arpeggio pattern in which sound production timings of arpeggio constituent sounds are stored and for automatically playing an arpeggio by performing sound production based on a note number input by a performer at a sound production timing in the arpeggio pattern, the arpeggiator including sound range designation part for designating an output sound range of a performance part; and sound range correction part for, in a case where the note number input by the performer is not within the sound range designated by the sound range designation part, correcting the note number to a note number within the sound range, in which the automatic performance part automatically plays the arpeggio by performing sound production based on the note number subjected to sound range correction by the sound range correction part at the sound production timing stored in the arpeggio pattern.

According to the present invention, there is provided a recording medium, which is computer-readable and records a program provided with an arpeggiator function of causing a computer having a storage portion to automatically play an arpeggio by performing sound production based on a note number input by a performer at a sound production timing in an arpeggio pattern, the storage portion functioning as storage part for storing the arpeggio pattern in which sound production timings of arpeggio constituent sounds are stored and sound range designation part for designating an output sound range of a performance part, the program provided with an arpeggiator function causing the computer to execute a sound range correction step of, in a case where the note number input by the performer is not within the sound range designated by the sound range designation part, correcting the note number to a note number within the sound range; and a sound production step of performing sound production based on the note number subjected to sound range correction in the sound range correction step at the sound production timing stored in the arpeggio pattern.

According to the present invention, there is provided a method of making arpeggio using an arpeggiator that includes automatic performance part having an arpeggio pattern in which sound production timings of arpeggio constituent sounds are stored and for automatically playing an arpeggio by performing sound production based on a note number input by a performer at a sound production timing in the arpeggio pattern, the arpeggiator further comprising sound range designation part for designating an output sound range of a performance part, and the method of making arpeggio comprising: a sound range correction step of, in a case where the note number input by the performer is not within the sound range designated by the sound range designation part, correcting the note number to a note number within the sound range; and a sound production step of performing sound production based on the note number subjected to sound range correction in the sound range correction step at the sound production timing stored in the arpeggio pattern.

BRIEF DESCRIPTION OF DRAWINGS

FIG. 3, (a) is a diagram schematically illustrating an Arp pattern table, (b) is a diagram schematically illustrating an Arp pattern, (c) is a diagram schematically illustrating an output setting table, and (d) is a diagram schematically illustrating a remain table.

FIG. 6, (a) is a flowchart illustrating note-off processing, (b) is a flowchart illustrating an arpeggio stop process, and (c) is a flowchart illustrating hold event processing.

FIG. 13, (a) is a diagram illustrating a sound production timing of a drum part, (b) is a diagram illustrating a sound production timing of a rhythm part, (c) is a diagram illustrating a sound production timing of a bass part, (d) is a diagram illustrating a velocity at the sound production timing of the drum part, (e) is a diagram illustrating a velocity at the sound production timing of the rhythm part, and (f) is a diagram illustrating a velocity at the sound production timing of the bass part.

FIG. 14, (a) is a diagram illustrating transition of a note number with respect to the number of steps in a case where an Oct reset function is OFF, and (b) is a diagram illustrating transition of a note number with respect to the number of steps in a case where the Oct reset function is ON.

DESCRIPTION OF EMBODIMENTS

Figure 1:
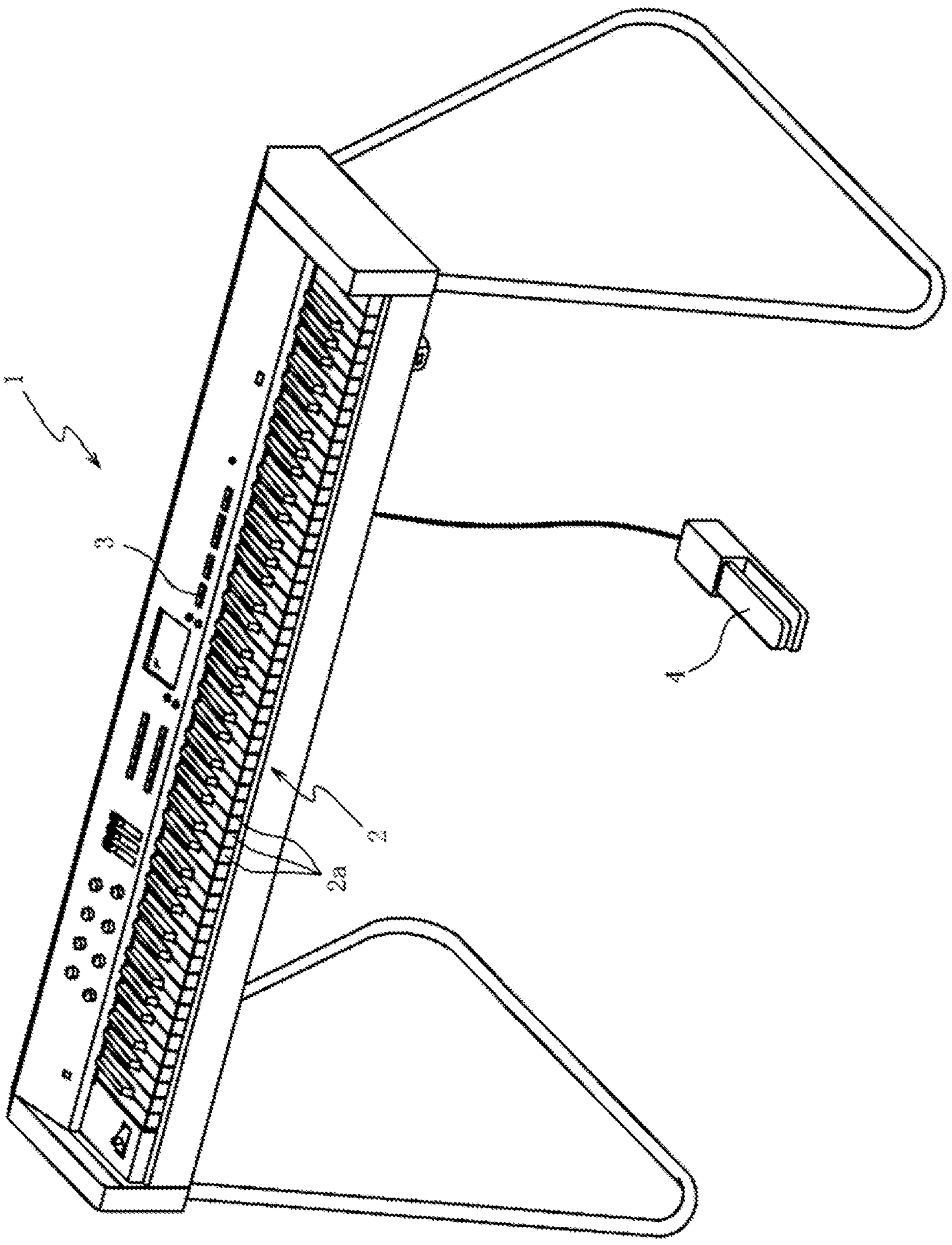
FIG. 1 is an appearance diagram of a synthesizer according to an embodiment.

Hereinafter, preferred embodiments will be described with reference to the accompanying drawings. FIG. 1 is an appearance diagram of a synthesizer 1 according to an embodiment. The synthesizer 1 is an electronic musical instrument (automatic performance device) that mixes and outputs (releases) musical sounds produced through a performance operation of a performer (user) or predetermined accompaniment sounds. The synthesizer 1 has an arpeggiator function of automatically playing an arpeggio in response to an input from a performer, and in the present embodiment, is configured to output each of arpeggios of three parts (performance parts) such as a rhythm part, a bass part, and a drum part that will be described independently.

As illustrated in FIG. 1, the synthesizer 1 is mainly provided with a keyboard 2, a setting key 3, and a hold pedal 4. A plurality of keys 2*a* is provided on the keyboard 2, and the keyboard 2 functions as an input device for acquiring performance information by a performer's playing. Performance information based on the Musical Instrument Digital Interface (MIDI) standard corresponding to a pressing or releasing operation for the key 2*a* of the performer is output to a CPU 10 (refer to FIG. 2).

Figure 5:
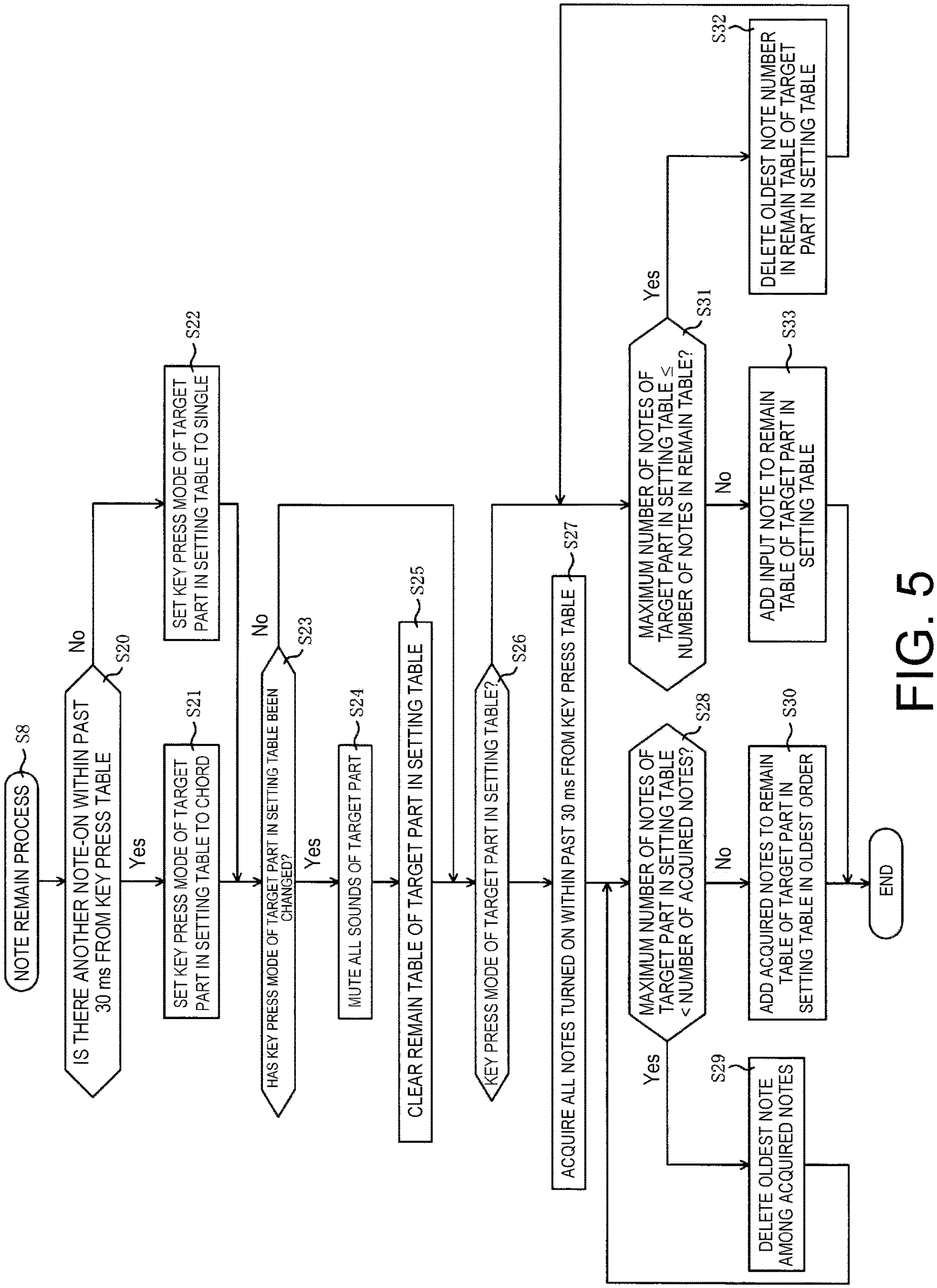
FIG. 5 is a flowchart illustrating a note remain process.

The setting key 3 is an operator for inputting various settings to the synthesizer. The setting key 3 sets various setting values for an arpeggio set in a setting table 11*e* that will be described later and a part of the arpeggio that is a processing target in a note remain process (FIG. 5). The hold pedal 4 is a foot-operated pedal that switches a hold function off and on, which will be described later. In a case where the performer steps on the hold pedal 4, the hold function is turned on, and in a case where the performer releases the hold pedal 4, the hold function is turned off.

Although details will be described later, the synthesizer 1 of the present embodiment is provided with an Oct shift reset function of resetting an increase of a note number at the beginning of each bar, in a duck function of suppressing muddiness of an output sound by correcting a velocity of one part to be reduced in a case where a sound production timing of the one part overlaps with a sound production timing of another specified part with respect to output of arpeggios, a key press mode of switching between outputting a distributed arpeggio and outputting a chord arpeggio according to an input timing to the key 2*a*, a key range function of correcting a note number of input one part to a preset sound range to output an arpeggio in a musical sound production range of the timbre thereof, or an Oct (octave) shift function of increasing a note number of input one part in the octave unit. In the following description, "arpeggio" may be abbreviated to "Arp", and "octave" may be abbreviated to "Oct".

Figure 2:
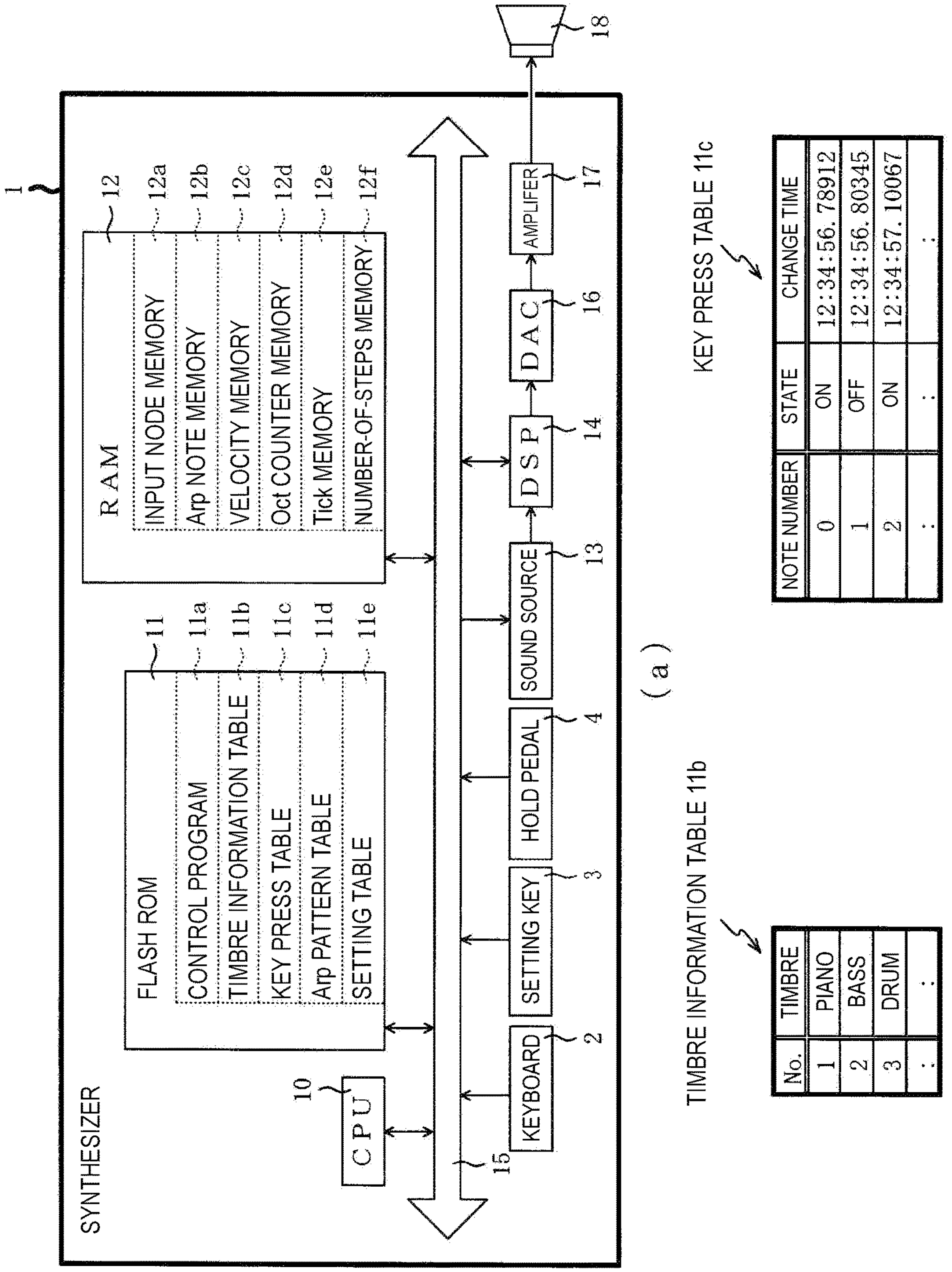
FIG. 2, (a) is a block diagram illustrating an electrical configuration of the synthesizer, (b) is a diagram schematically illustrating a timbre information table, and (c) is a diagram schematically illustrating a key press table.

Next, an electrical configuration of the synthesizer 1 will be described with reference to FIGS. 2 and 3. (a) of FIG. 2 is a block diagram illustrating an electrical configuration of the synthesizer 1. The synthesizer 1 has a CPU 10, a flash ROM 11, a RAM 12, a keyboard 2, a setting key 3, a hold pedal 4, a sound source 13, and a digital signal processor 14 (hereinafter referred to as a "DSP 14"), which are connected to each other via a bus line 15. A digital-to-analog converter (DAC) 16 is connected to the DSP 14, an amplifier 17 is connected to the DAC 16, and a speaker 18 is connected to the amplifier 17.

The CPU 10 is an arithmetic unit that controls each part connected thereto via the bus line 15. The flash ROM 11 is a rewritable non-volatile memory, and is provided with a control program 11*a*, a timbre information table 11*b*, a key press table 11*c*, an Arp pattern table 11*d*, and a setting table 11*e*.

Figure 4:
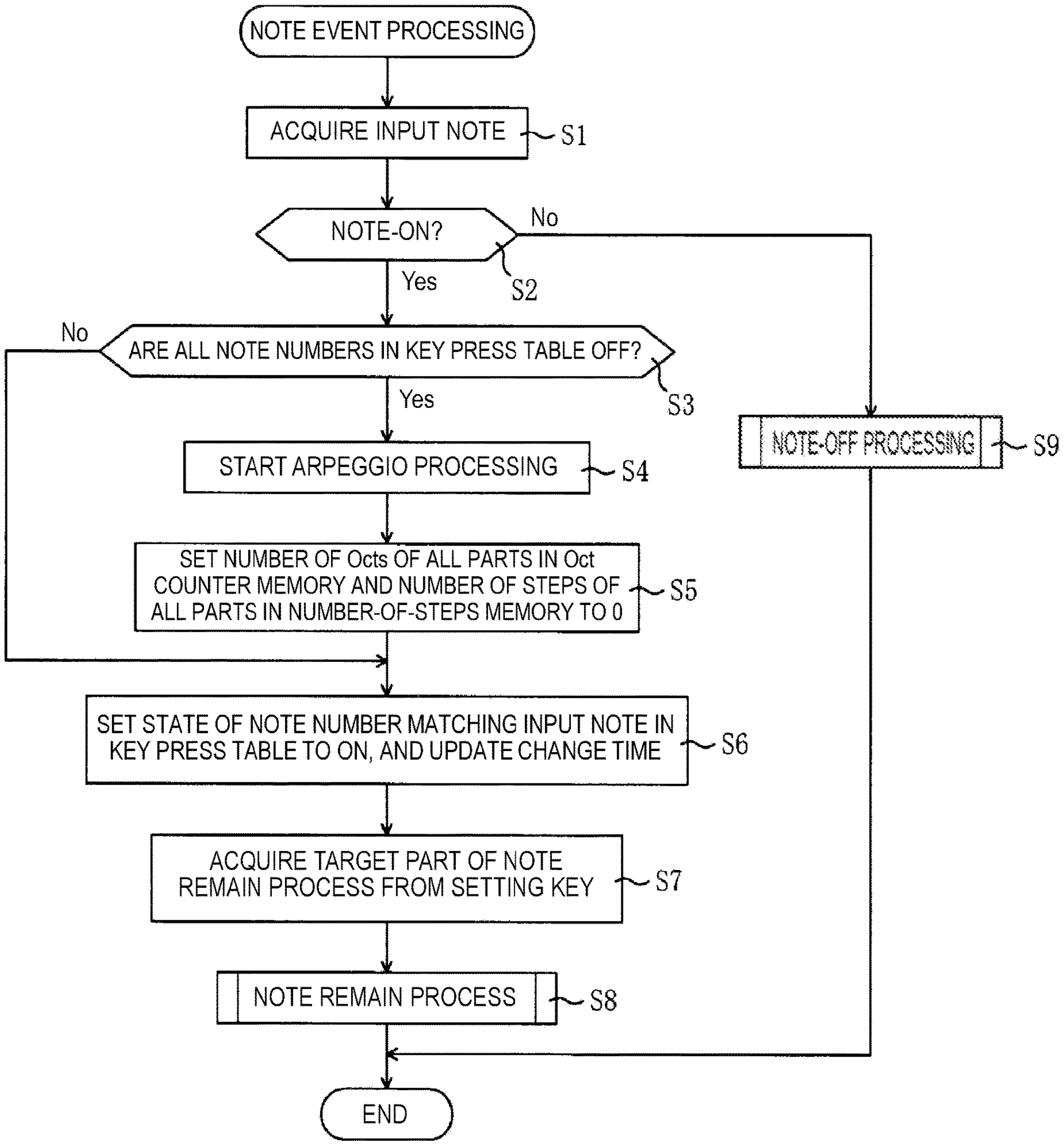
FIG. 4 is a flowchart illustrating note event processing.
Figure 7:
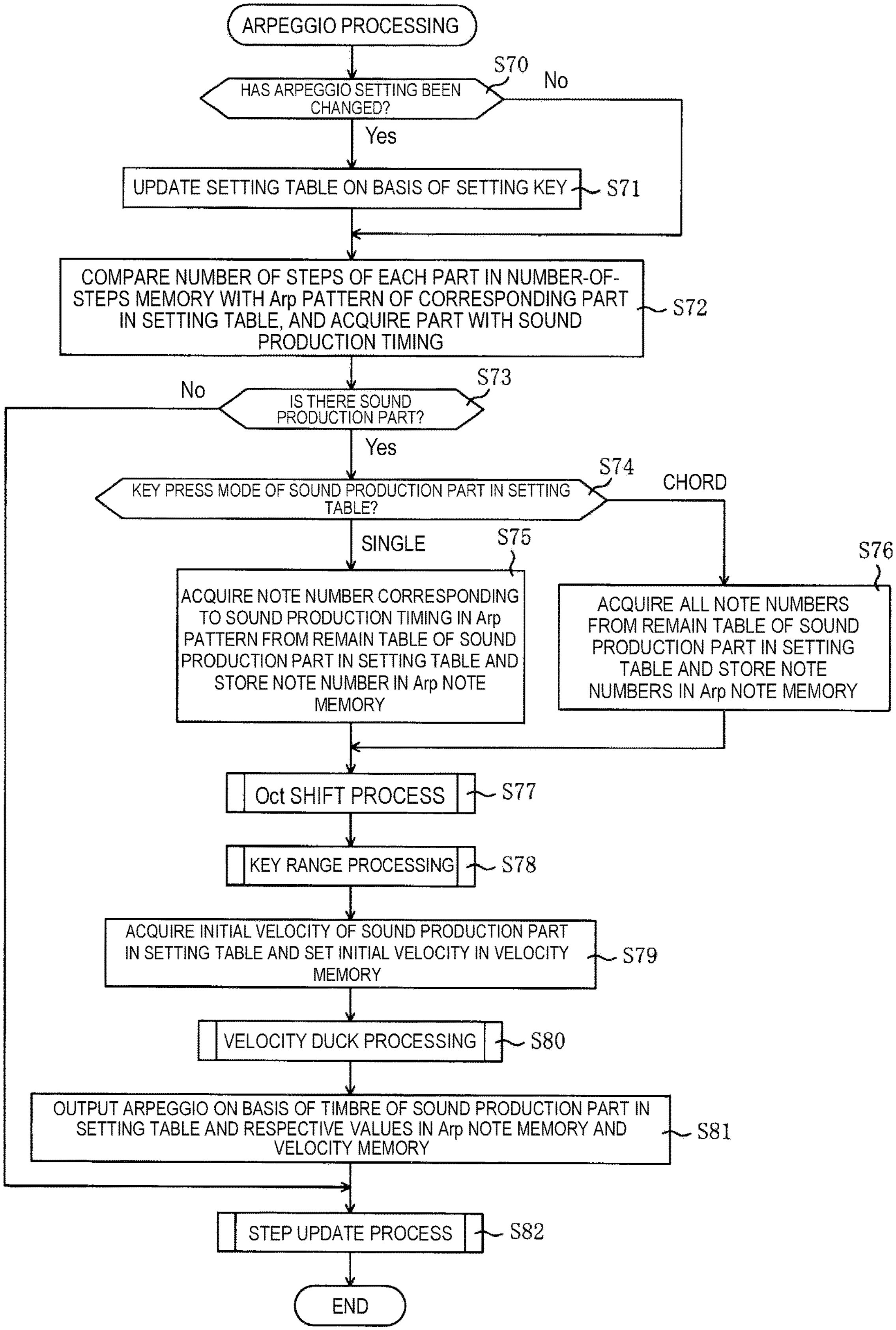
FIG. 7 is a flowchart illustrating arpeggio processing.

When the control program 11*a* is executed by the CPU 10, note event processing in FIG. 4 or arpeggio processing in FIG. 7 is executed. The timbre information table 11*b* is a data table that stores information regarding the timbre in the synthesizer 1. The timbre information table 11*b* will be described with reference to (b) of FIG. 2.

(b) of FIG. 2 is a diagram schematically illustrating the timbre information table 11*b*. As illustrated in (b) of FIG. 2, the timbre information table 11*b* stores timbre such as a piano, a bass, and a drum that can be produced by the synthesizer 1. By setting the timbre stored in the timbre information table 11*b* in the setting table 11*e* that will be described later in (c) of FIG. 3 that will be described later, the timbre of each part is set.

(a) of FIG. 2 will be referred to again. The key press table 11*c* is a data table that stores an on/off state of the key 2*a* (refer to FIG. 1) of the keyboard 2 and a change time of the on/off state. The key press table 11*c* will be described with reference to (c) of FIG. 2.

(c) of FIG. 2 is a diagram schematically illustrating the key press table 11*c*. As illustrated in (c) of FIG. 2, the key press table 11*c* stores a note number assigned to each of the keys 2*a*, an on/off state in the note number, and a change time which is the time at which the on/off state is changed. In the present embodiment, the change time is stored in units of 10 μsec. Each time the key 2*a* is pressed or released, an on/off state in a corresponding note number in the key press table 11*c* is updated, and a time at which the key 2*a* is pressed or released is stored in the change time.

(a) of FIG. 2 will be referred to again. The Arp pattern table 11*d* is a data table that stores an Arp pattern (arpeggio pattern) in which an arpeggio production timing in one bar unit is set. The Arp pattern table 11*d* will be described with reference to (a) and (b) of FIG. 3.

(a) of FIG. 3 is a diagram schematically illustrating the Arp pattern table 11*d*. As illustrated in (a) of FIG. 3, the Arp pattern table 11*d* stores an Arp pattern A1, an Arp pattern A2, an Arp pattern A3, . . . that are preset Arp patterns. Here, a configuration of the Arp pattern will be described with reference to (b) of FIG. 3 by using the Arp pattern A1 as an example.

(b) of FIG. 3 is a diagram schematically illustrating the Arp pattern A1. In the Arp pattern, a sound production timing is stored for each pitch that is produced as an arpeggio. The sound production timing is set for each of a plurality of "steps" into which a timing in one bar is equally divided. Specifically, in the Arp pattern A1, in sound that is output as an arpeggio of a certain part, sounds with three pitches of note numbers A to C are set, and for each of the note numbers A to C, a sound production timing out of timings obtained by dividing one bar into eight steps such as 0 to 7 is set. In (b) of FIG. 3, for description, "O" is added to a sound production timing among the number of steps of 0 to 7.

In the Arp pattern A1, the note number A has the number of steps of 2 and 6 as sound production timings, the note number B has the number of steps of 0 to 7 as sound production timings, and the note number C has the number of steps of 3 and 7 as sound production timings. Specific note numbers (note numbers are note numbers stored in the remain table that will be described later) are assigned to the respective note numbers A to C in the Arp pattern A1 in which the sound production timings are set as described above, and arpeggios are automatically played by repeating sound production at sound production timings set to the number of steps of 0 to 7.

Referring to (a) of FIG. 2 again, the setting table 11*e* is a data table that stores settings related to output of musical sounds such as timbre and Arp patterns for each part of an arpeggio. An arpeggio is produced according to the timbre, the Arp pattern, and the like, which will be described later, set in the setting table 11*e*. The setting table 11*e* will be described with reference to (c) of FIG. 3.

(c) of FIG. 3 is a diagram schematically illustrating the setting table 11*e*. In the setting table 11*e*, setting items such as timbre, an Arp pattern, a step Tick, a remain table, the maximum number of notes, a key press mode, a velocity, key range change function on/off setting, a lowest note number, an allowable Oct width, Oct shift function on/off setting, an Oct shift width, Oct reset function on/off setting, duck function on/off setting, a duck part, a duck note, and a duck rate are provided for each of three parts including a rhythm part, a bass part, and a drum part.

One of the types of timbre stored in the timbre information table 11*b* (refer to (b) of FIG. 2) is set as the timbre, and one of the Arp patterns A1, A2, . . . stored in the Arp pattern table 11*d* is set as the Arp pattern. In the step Tick, the required time for each step set in the Arp pattern, that is, a Tick value is stored. In the present embodiment, "1 msec" is exemplified as the required time per Tick.

The remain table stores pitch information of sound output as an arpeggio for each part. In the setting table 11*e*, a remain table R1 is set as the remain table of the rhythm part, a remain table R2 is set as the remain table of the bass part, and a remain table R3 is set as the remain table of the drum part. Here, with reference to (d) of FIG. 3, details of the remain table will be described by using the remain table R1 as an example.

(d) of FIG. 3 is a diagram schematically illustrating the remain table R1. In the remain table, a note number of the corresponding key 2*a* and the acquisition time that is the time at which the key is pressed are stored in the order in which the keys 2*a* are pressed. In the present embodiment, the acquisition time is stored in units of 10 μsec, similar to the change time of the key press table 11*c* in (c) of FIG. 2.

Specifically, in the remain table R1, the acquired note numbers "55", "60", and "70" are stored in association with the acquisition times "13:56:00.50102", "13:56:00.60203", and "13:56:00.70304".

(c) of FIG. 3 will be referred to again. In the maximum number of notes, the maximum number of sounds, which is the maximum number of chords output by a series of arpeggios for each part, is stored. In the key press mode, a mode of an arpeggio for pressing of the key 2*a* is stored, and specifically, one of modes such as "single" for outputting an arpeggio in which chords of sound corresponding to the pressed key 2*a* are distributed and "chord" for outputting a chord arpeggio of sound corresponding to the pressed key 2*a* is stored. An initial value of the velocity for each part is stored in the velocity.

An enabled/disabled (on/oft) setting state of the key range change function is stored in the key range change function. As the lowest note number, a note number corresponding to a lower limit of a sound production range that is considered to have a small sense of discomfort in hearing is stored with respect to the timbre in the setting table 11*e*. In the allowable Oct width, the number of Octs up to a note number corresponding to an upper limit of the sound production range in a case where the pitch is increased in order from the lowest note number is stored.

In the Oct shift function, an enabled/disabled (on/oft) setting state of the Oct shift function is stored. In the Oct shift width, the number of Octs (compass) to be changed in the Oct shift function is stored. Enabled/disabled (on/oft) of the Oct reset function is stored in the Oct reset function on/off setting.

As a setting value for the duck, an enabled/disabled (on/off) setting state of the duck function is stored in the duck function. In the duck part, other parts referred to when ducking in the duck function are stored.

In the duck note, a note number to be referred to when further ducking in the duck part is stored. In particular, in a case where all the note numbers of the duck part are ducking targets, "ANY" indicating that fact is stored in the duck note. In the duck rate, a rate of change in the velocity of the part when ducking is stored.

In the present embodiment, the remain table and the key press mode in the setting table 11*e* are set to setting values according to the input to the key 2*a*, and the timbre, the Arp pattern, the step Tick, the maximum number of notes, the velocity, and the key range change function on/off setting, the lowest note number, the allowable Oct width, the Oct shift function on/off setting, the Oct shift width, the Oct reset function on/off setting, the duck function on/off setting, the duck part, the duck note, and the duck rate in the setting table 11*e* are set to setting values using the setting key 3. An arpeggio is output on the basis of the setting value of each part set in the setting table 11*e* in the above-described way.

Referring to (a) of FIG. 2 again, the RAM 12 is a memory that stores various work data, flags, and the like in a rewritable manner when the CPU 10 executes a program such as the control program 11*a*, and is provided with an input note memory 12*a* that stores a note number of a sound input from the keyboard 2, an Arp note memory 12*b*, a velocity memory 12*c* that stores a velocity value of an arpeggio to be produced, an Oct counter memory 12*d*, a Tick memory 12*e* that stores a Tick value, and a number-of-steps memory 12*f*.

The Arp note memory 12*b* is a memory in which a note number of an arpeggio to be produced is stored. The Arp note memory 12*b* is configured to store a plurality of note numbers, and in a case where a plurality of note numbers is stored in the Arp note memory 12*b*, sounds having the plurality of note numbers stored in the Arp note memory 12*b* are produced at the same sound production timing.

The Oct counter memory 12*d* is a memory that stores the number of Octs of a sound that is being produced in the Oct shift function, and the number-of-steps memory 12*f* is a memory that stores the current step in an arpeggio pattern. In the present embodiment, the Oct counter memory 12*d* and the number-of-steps memory 12*f* store the number of Octs and the number of steps separately for each part.

The sound source 13 is a device that outputs waveform data according to performance information input from the CPU 10, and the DSP 14 is an arithmetic unit for arithmetically processing the waveform data input from the sound source 13. The DAC 16 is a conversion device that converts the waveform data input from the DSP 14 into analog waveform data. The amplifier 17 is an amplification device that amplifies the analog waveform data output from the DAC 16 with a predetermined gain, and the speaker 18 is an output device that emits (outputs) the analog waveform data amplified by the amplifier 17 as musical sounds.

Next, a process executed by the CPU 10 will be described with reference to FIGS. 4 to 14. FIG. 4 is a flowchart illustrating note event processing. The note event processing is an interruption process executed when pressing or releasing of the key 2*a* (refer to FIG. 1) of the keyboard 2 is detected.

In the note event processing, first, a note number corresponding to the pressed or released key 2*a* is acquired and stored in the input note memory 12*a* (S1). After the process in S1, it is checked whether there is note-on, that is, whether the key 2*a* is pressed (S2).

In the process in S2, in a case where there is note-on (S2: Yes), it is checked whether all the note numbers in the key press table 11*c* are off, that is, whether none of the keys 2*a* is pressed (S3). In the process in S3, in a case where all the note numbers in the key press table 11*c* are OFF (S3: Yes), this time is a timing at which any key 2*a* is pressed from the state in which none of the keys 2*a* is pressed and is also a timing to start to play an arpeggio, and thus arpeggio processing that will be described later is started in FIG. 7 (S4). The arpeggio processing started through the process in S4 is subsequently executed every 400 μsec.

After the process in S4, the number of Octs of all the parts in the Oct counter memory 12*d* and the number of steps of all the parts in the number-of-steps memory 12*f* are set to 0 (S5). That is, with the start of playing the arpeggio, 0 is set as the number of Octs used in the Oct shift function and the number of steps in the Arp pattern.

In a case where any key in the key press table 11*c* is ON in the process in S3 (S3: No), the arpeggio processing has already started, and thus the processes in S4 and S5 are skipped. After the processes in S3 and S5, among the note numbers in the key press table 11*c*, a note number matching the pressed key 2*a* is set to ON, and the change time is updated to the current time (S6).

After the process in S6, a target part of the note remain process that will be described later is acquired from the setting key 3 (S7). After the process in S7, the note remain process is executed (S8). Here, the note remain process will be described with reference to FIG. 5.

FIG. 5 is a flowchart illustrating the note remain process. The note remain process is a process of setting a note number corresponding to an input to the key 2*a* in the remain table of the target part and setting a key press mode according to an input timing for the key 2*a*. In the note remain process in FIG. 5, the "target part" represents the set part acquired from the setting key 3 in the process in S7 of FIG. 4. In a case where a plurality of target parts is set by the setting key 3, a process is individually performed for each part.

In the note remain process, first, it is checked whether there is another note-on within the past 30 msec from the key press table 11*c* (S20). Specifically, note numbers of which states are on in the key press table 11*c* are acquired, and it is checked whether there is a note number of which a change time is within 30 msec from the current time among the note numbers.

In a case where there is another note-on within the past 30 msec in the process in S20 (S20: Yes), the key press mode of the target part in the setting table 11*e* is set to "chord" (S21). On the other hand, in a case where there is no other note-on within the past 30 msec in the process in S20 (S20: No), in the key press mode of the target part in the setting table 11*e* is set to "single" (S22).

That is, in a case where there is another note-on within the past 30 msec, it is determined that the note was input at the same time as an input note that is input this time, so a "chord" for outputting a chord arpeggio is set in the key press mode of the target part. On the other hand, in a case where there is no any note-on within the past 30 msec, it is determined that the input note this time is not input at the same time as other notes, and "single" for outputting a distributed arpeggio is set in the key press mode of the target part.

After the processes in S21 and S22, it is checked whether the key press mode of the target part in the setting table 11*e* is changed by the processes in S21 and S22 (S23). In a case where the key press mode is changed in the process in S23 (S23: Yes), all the sounds having the note numbers stored in the remain table of the target part in the setting table 11*e* are muted (S24), and the note numbers and acquisition times in the remain table are cleared (S25). On the other hand, in a case where the key press mode of the target part is not changed by the processes in S21 and S22 (S23: No), the processes in S24 and S25 are skipped.

After the processes in S23 and S25, the key press mode of the target part in the setting table 11*e* is checked (S26). In a case where the key press mode of the target part is "chord" in the process in S26(S26: chord), all the note numbers turned on within the past 30 msec are acquired from the key press table 11*c* (S27). Specifically, in the key press table 11*c*, notes of which states are on are acquired, and among the notes, all notes of which change times are within 30 msec from the current time are acquired. The notes acquired in the process in S27 include a note input this time.

After the process in S27, it is checked whether the number of notes acquired in the process in S27 is larger than the maximum number of notes of the target part in the setting table 11*e* (S28). In the process in S28, in a case where the number of acquired notes is larger than the maximum number of notes of the target part (S28: Yes), the oldest note among the acquired notes, that is, the note of which the change time in the key press table 11*c* is the earliest is deleted (S29), and the process in S28 is executed again with the remaining notes as the acquired notes.

On the other hand, in the process in S28, in a case where the number of acquired notes is equal to or smaller than the maximum number of notes of the target part (S28: No), the acquired notes are arranged in the oldest order, that is, in the order of the earliest change time, and a note number and a change time of the note number are added to the remain table of the target part in the setting table 11*e* (S30).

In a case where the key press mode of the target part is single in the process in S26(S26: single), it is checked whether the number of notes of the target part stored in the remain table in the setting table 11*e* is equal to or larger than the maximum number of notes of the target part in the setting table 11*e* (S32). In the process in S32, in a case where the number of notes of the target part in the remain table is equal to or greater than the maximum number of notes in the target part (S31: Yes), the oldest note from the remain table of the target part, that is, the note of which the acquisition time in the remain table of the target part is earliest is deleted (S32), and then the process in S31 is executed again.

On the other hand, in the process in S31, if the number of notes stored in the remain table of the target part is smaller than the maximum number of notes of the target part (S31: No), the note number in the input note memory 12*a* added to the remain table of the target part together with the acquisition time thereof (S33). After the processes in S31 and S35, the note remain process is finished, and the process returns to the note event processing in FIG. 4.

FIG. 4 will be referred to again. In the process in S2, in a case where there is note-off, that is, any of the keys 2*a* is released (S2. No), note-off processing is performed (S9). The note-off processing will be described with reference to (a) and (b) FIG. 6.

(a) of FIG. 6 is a flowchart illustrating the note-off processing. In the note-off processing, first, a note number matching the pressed key 2*a* in the key press table 11*c* is set to OFF, and the change time is updated to the current time (S40).

After the process in S40, it is checked whether a hold setting is OFF (S41). The hold setting is a setting value indicating whether the hold pedal is depressed or released in a hold event processing that will be described later in (c) of FIG. 6. In the process in S41, in a case where the hold setting is OFF (S41: Yes), the arpeggio stop process (S42) is performed. Here, the arpeggio stop process will be described with reference to (b) of FIG. 6.

(b) of FIG. 6 is a flowchart illustrating the arpeggio stop process. In the arpeggio stop process, first, it is checked whether states of all the note numbers in the key press table 11*c* are off (S50). In a case where all the note numbers in the key press table 11*c* are off in the process in S50 (S50: Yes), the arpeggio processing is stopped (S51). The remain tables of all parts in the setting table 11*e* are cleared (S52). Consequently, the execution of the arpeggio processing that will be described later in FIG. 7 every 400 μsec is stopped, and the output of the arpeggio is stopped.

On the other hand, in a case where any of the note numbers in the key press table 11*c* is ON (S50: No), the processes in S51 and S52 are skipped. Then, after the process in S51 and S52, the note-off processing is finished, and the process returns to the note event processing in FIG. 5.

(a) of FIG. 6 will be referred to again. In a case where the hold setting is ON (S41: No), the arpeggio stop process in S42 is skipped. After the processes in S41 and S42, the note-off processing is finished.

Here, the hold event processing will be described with reference to (c) of FIG. 6. The hold event process is an interruption process executed in a case where an on/off state of the hold pedal 4 is changed. In the hold event processing, first, a state of the hold pedal 4 is checked (S60). In the process in S60, in a case where the state of the hold pedal 4 is ON (S60: ON), the hold setting is turned on (S61).

On the other hand, in the process in S60, in a case where the state of the hold pedal 4 is OFF (S60. OFF), the hold setting is turned off (S62), and the arpeggio stop process (S62) described in (b) of FIG. 6 is performed. After the processes in S42 and S61, the hold event processing is finished.

That is, in the note-off processing in (a) of FIG. 6, in a case where the hold setting is OFF (S41: Yes in (a) of FIG. 6), one of the keys 2*a* is pressed, and thus there is a note number of which a state is ON in the key press table 11*c* (S50: Yes in (b) of FIG. 6), the stoppage of the arpeggio processing and the clearing of the note numbers in the remain tables of all the parts in the setting table 11*e* are skipped. In this case, the note numbers of the remain tables of all the parts in the setting table 11*e* are maintained in a state before the key 2*a* is released.

Therefore, in a case where any of the keys 2*a* is pressed, a state of the remain table in the setting table 11*e* at the time of the last note-on is maintained, and the arpeggio output based on the remain table is continued. Consequently, when outputting an arpeggio, it is not necessary to keep pressing all the keys 2*a* corresponding to note numbers to be output as the arpeggio, and thus the operability of a performer for the arpeggio output can be improved. In a case where all the keys 2*a* are released, the arpeggio output is stopped, and thus the performer can intuitively and easily stop the arpeggio output.

On the other hand, in the note-off processing, in a case where the hold setting is ON (S41: No in (a) of FIG. 6), the arpeggio stop process in S42 is skipped. Consequently, even if all the keys 2*a* are released, the state of the remain table in the setting table 11*e* at the time of the last note-on is maintained, and thus the arpeggio output based on the remain table is continued.

Consequently, in a case where the performer depresses the hold pedal 4 and the hold setting is ON, the performer can release his/her hand from the key 2*a* while continuing the arpeggio output. Therefore, the performer can operate the setting key 3 or other devices or perform other work. When the performer releases the hold pedal 4 in this state and the hold setting is turned off, the arpeggio output is stopped. Therefore, the arpeggio output can be stopped not only by the operation on the key 2*a* but also by the operation on the hold pedal 4, and thus the operability of the performer for the arpeggio output can be improved.

Referring to FIG. 4 again, after the note remain process in S8 or the note-off process in S9, the note event processing is finished.

Next, the arpeggio processing will be described with reference to FIG. 7. FIG. 7 is a flowchart illustrating the arpeggio process. The arpeggio process is a timer interruption process that is periodically executed every 400 μsec in a case where an instruction for starting the arpeggio process is given in the process in S4 in FIG. 4.

In the arpeggio process, first, it is checked whether an arpeggio setting in the setting key 3 has been changed (S70). In a case where the arpeggio setting has been changed in the process in S70 (S70: Yes), the changed arpeggio setting is acquired from the setting key 3 and stored in the setting table 11*e* (S71). In particular, the timbre corresponding to a set value that is set with the setting key 3 is acquired from the timbre information table 11*b* and stored in the setting table 11*e*, and an Arp pattern corresponding to the set value set with the setting key 3 is acquired from the Arp pattern table 11*d* and stored in the setting table 11*e*. On the other hand, in a case where the arpeggio setting has not been changed (S70: No), the process in S71 is skipped.

After the processes in S70 and S71, the number of steps of each part in the number-of-steps memory 12*f* is compared with sound production timings in the Arp pattern of all the parts in the setting table 11*e*, and a part with a sound production timing is acquired (S72). In the following processes in FIGS. 7 to 10, the part acquired in the process in S72 will be referred to as a "sound production part".

After the process in S72, it is checked whether the sound production part has been acquired in the process in S72 (S73). In a case where the sound production part has been acquired in the process in S73 (S73: Yes), a key press mode of the sound production part in the setting table 11*e* is checked (S74). In the process in S74, in a case where the key press mode of the sound production part is single (S74: single), a note number corresponding to the sound production timing in the Arp pattern of the sound production part is acquired from the remain table of the sound production part in the setting table 11*e* and stored in the Arp note memory 12*b* (S75).

Specifically, a note corresponding to the number of steps of the current sound production part in the number-of-steps memory 12*f* is acquired from the Arp pattern of the sound production part in the setting table 11*e*, and a note number assigned to the note is acquired from the remain table in the setting table 11*e* and stored in the Arp note memory 12*b*.

Here, assignment between the Arp pattern and the remain table in a case where the key press mode is single will be described. In the present embodiment, note numbers in the order stored in the remain table are assigned to a plurality of note numbers set in the Arp pattern. Specifically, when describing the assignment between the Arp pattern A1 in (b) of FIG. 3 and the remain table R1 in (d) of FIG. 3 as an example, the note numbers A to C are set in the Arp pattern A1, and the note numbers "55", "60", and "70" in the stored order are set in the remain table R1. Therefore, in a case where the remain table R1 is assigned to the Arp pattern A1, "55" is assigned to the note number A of the Arp pattern A1, "60" is assigned to the note number B is, and "70" is assigned to the note number C.

In this example, in a case where the number of steps, which is the sound production timing, is 0 in the process in S75, the note number "60" corresponding to the note number B of the Arp pattern A1 is acquired and stored in the Arp note memory 12*b*. In a case where the number of steps is 2, the note numbers "60" and "70" respectively corresponding to the note numbers B and C of the Arp pattern A1 are acquired and stored in the Arp note memory 12*b*.

On the other hand, in the process in S74, in a case where the key press mode of the sound production part is a chord (S74: chord), all the note numbers are acquired from the remain table of the sound production part in the setting table 11*e* and stored in the Arp note memory 12*b* (S76). When describing the Arp pattern A1 in (b) of FIG. 3 and the remain table R1 in (d) of FIG. 3 as an example, the note numbers A to C are set in the Arp pattern A1 and the stored note numbers "55", "60", and "70" are set in the remain table R1.

That is, in a case where the key press mode is chord, all the note numbers are acquired from the remain table of the sound production part in the setting table 11*e* and set in the Arp note memory 12*b*. Consequently, all sounds having the note numbers stored in the remain table are simultaneously output at the sound production timing set in the Arp pattern. That is, it is possible to output an expressive arpeggio based on "chords" including all the sounds having the note numbers set in the remain table.

On the other hand, in a case where the key press mode is single, the note numbers of the remain table are respectively assigned to the note numbers of the Arp pattern, and a note number corresponding to the sound production timing is acquired from the note numbers and set in the Arp note memory 12*b*. Consequently, it is possible to output a distributed arpeggio based on sounds having the note numbers stored in the remain table.

The chord arpeggio in a case where the key press mode is chord is output according to the same Arp pattern as the distributed arpeggio in a case where the key press mode is single. Consequently, since it is not necessary to create an Arp pattern according to the key press mode, it is possible to reduce the time and effort required to create the Arp pattern and also reduce a storage capacity of the Arp pattern table 11*d* in which the Arp pattern is stored.

Incidentally, in the note remain process in FIG. 5, every time the key press mode is changed from chord to single or from single to chord, sound production of the note number stored in the remain table is stopped and the remain table is cleared. Consequently, since sounds that make up an arpeggio that are output before the key press mode is changed are not mixed in an arpeggio after the key press mode is changed, it is possible to prevent sound that the performer does not intend from being mixed in the arpeggio after the key press mode is changed or the arpeggio from becoming dissonance.

In the note remain process in FIG. 5, the key press mode is set to chord in a case where new note-on occurs within 30 msec from the past note-on, that is, in a case where the note-ons occur simultaneously, and the key press mode is set to single in a case where new note-on occurs after 30 msec or more from the past note-on, that is, in a case where the note-ons are distributed.

That is, depending on whether the note-ons occur simultaneously or in a distributed manner, a mode of the output arpeggio also switches between outputting a chord arpeggio and outputting a distributed arpeggio. Consequently, a difference in mode between a performance operation of a performer on the key 2*a* and an output arpeggio can be reduced, and thus the performer can suppress a sense of discomfort in the arpeggio output with respect to the performance operation on the key 2*a*.

After the process in S75 and S76, the Oct shift process (S77) is executed. Here, the Oct shift process will be described with reference to FIG. 8.

Figure 8:
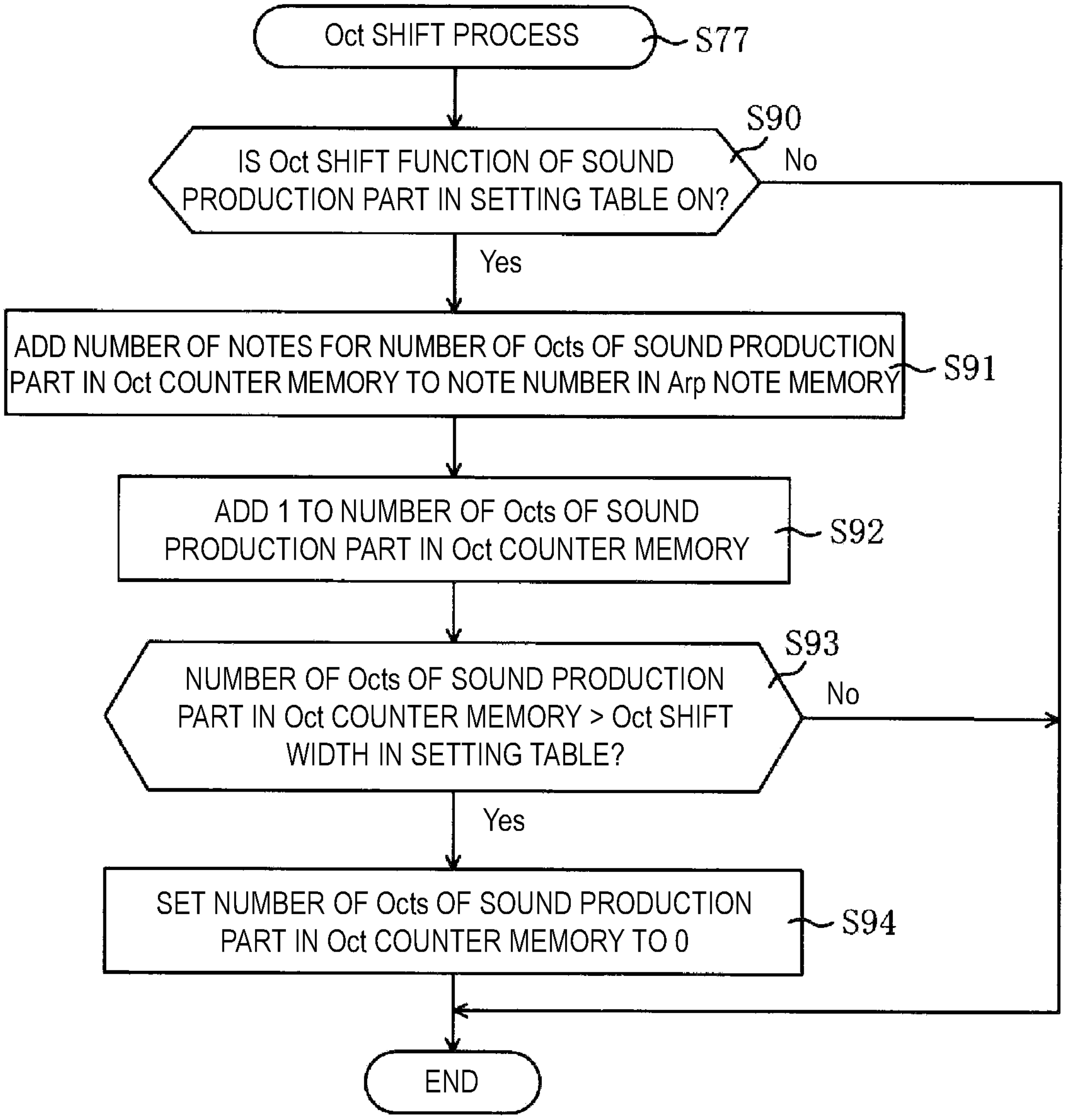
FIG. 8 is a flowchart illustrating an Oct shift process.

FIG. 8 is a flowchart illustrating the Oct shift process. The Oct shift process is a process of increasing an Oct of a note number in the Arp note memory 12*b* on the basis of an Oct shift width of the sound production part in the setting table 11*e*.

In the Oct shift process, first, it is checked whether the Oct shift function of the sound production part in the setting table 11*e* is ON (S90). In the process in S90, in a case where the Oct shift of the sound production part is ON (S90: Yes), the number of notes corresponding to the number of Octs of the sound production part in the Oct counter memory 12*d* is added to the note number in the Arp note memory 12*b* (S91). Consequently, the note number in the Arp note memory 12*b* is increased by the number of Octs of the sound production part in the Oct counter memory 12*d*.

After the process in S91, 1 is added to the number of Octs of the sound production part in the Oct counter memory 12*d* (S91), and it is checked whether the result is larger than the Oct shift width of the sound production part in the setting table 11*e* (S93). In the process in S93, in a case where the number of Octs of the sound production part in the Oct counter memory 12*d* is larger than the Oct shift width of the sound production part in the setting table 11*e* (S93: Yes), 0 is set as the number of Octs of the sound production part in the Oct counter memory 12*d* (S94).

Therefore, in a case where the Oct shift function is ON, the note number is increased to the Oct shift width of the sound production part from the note number acquired in the process in S75 or S76 in FIG. 7, and then the note number is returned to the acquired note number and is increased to the Oct shift width again. Consequently, an arpeggio in which a pitch changes periodically is output.

As details will be described later in FIG. 11, in a case where the Oct reset function is ON, the number of Octs of the sound production part in the Oct counter memory 12*d* is set to 0 even at the sound production timing at the beginning of the Arp pattern, that is, at the beginning of each bar. Then, the beginning of each bar and the start of change in pitch due to the Oct shift function are synchronized.

In a case where the number of Octs of the sound production part in the Oct counter memory 12*d* is equal to or less than the Oct shift width of the sound production part in the setting table 11*e* in the process in S93 (S93: No), the process in S94 is skipped, and in a case where the Oct shift of the sound production part is OFF in the process in S90 (S90. No), the processes in S91 to S94 are skipped. After the processes in S90, S93, and S94, the process returns to the arpeggio processing in FIG. 7.

After the Oct shift process in S77, the key range processing (S78) is executed. Here, the key range processing will be described with reference to FIG. 9.

Figure 9:
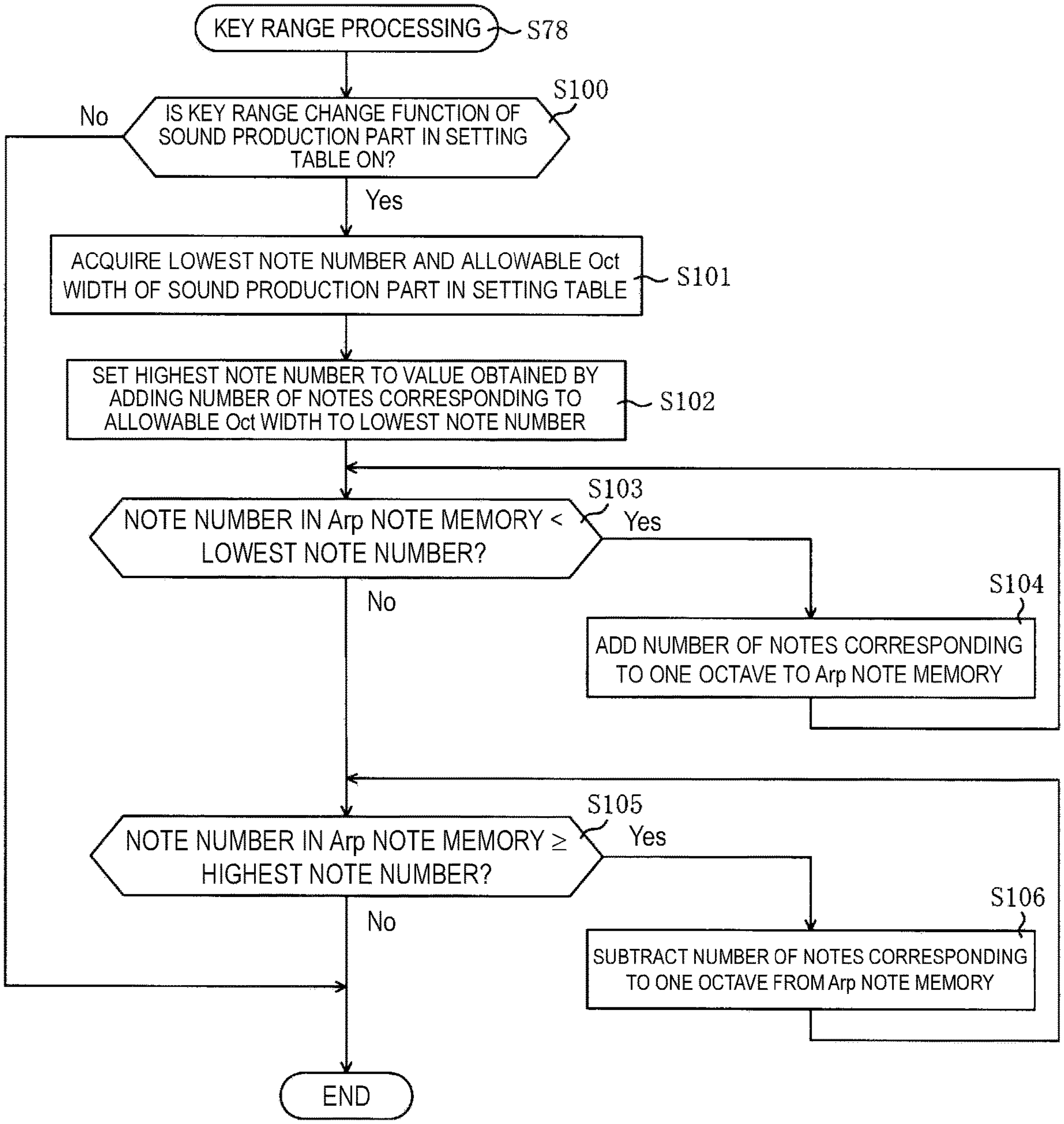
FIG. 9 is a flowchart illustrating key range processing.

FIG. 9 is a flowchart illustrating the key range processing. The key range processing is a process of adding or subtracting a note number in the Arp note memory 12*b* to correct a sound range of the note number within a range on the basis of the lowest note number and the allowable Oct width of the sound production part in the setting table 11*e*.

In the key range processing, first, it is checked whether the key range change function of the sound production part in the setting table 11*e* is ON (S100). In the process in S100, in a case where the key range change function of the sound production part is ON (S100: Yes), the lowest note number and the allowable Oct width of the sound production part are acquired from the setting table 11*e* (S101). After the process in S91, a value obtained by adding the number of notes corresponding to the allowable Oct width to the acquired lowest note number is set as the highest note number (S102).

After the process in S102, it is checked whether the note number in the Arp note memory 12*b* is lower than the lowest note number acquired in the process in S91 (S103). In the process in S103, in a case where the note number in the Arp note memory 12*b* is lower than the lowest note number (S103: Yes), the number of notes corresponding to one octave is added to the note number in the Arp note memory 12*b* (S104), and the process in S103 is performed again.

On the other hand, in the process in S103, in a case where the note number in the Arp note memory 12*b* is equal to or higher than the lowest note number (S103: No), it is checked whether the note number in the Arp note memory 12*b* is equal to or higher than the highest note number set in S91 (S105). In the process in S105, in a case where the note number in the Arp note memory 12*b* is equal to or higher than the highest note number (S105: Yes), the number of notes corresponding to one octave is subtracted from the note number in the Arp note memory 12*b* (S106), and then the process in S105 is performed again.

In a case where the note number in the Arp note memory 12*b* is lower than the highest note number in the process in S105 (S105. No), or in a case where the key range change function of the sound production part is OFF in the process in S100 (S100: No), the key range processing is finished and the process returns to the arpeggio processing in FIG. 7.

Figure 12:
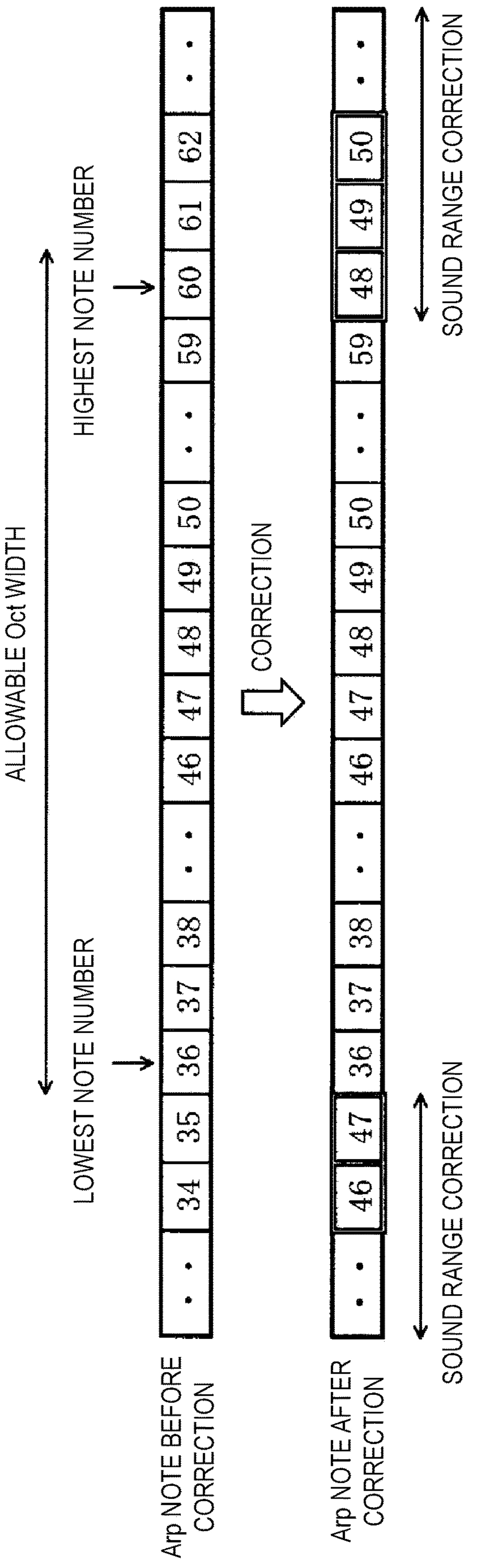
FIG. 12 is a diagram illustrating Arp notes before and after correction using a key range function.

Here, the key range function will be described with reference to FIG. 12. FIG. 12 is a diagram illustrating Arp notes before and after correction using the key range function. In FIG. 12, note numbers in the Arp note memory 12*b* are illustrated in ascending order. In FIG. 12, the lowest note number is set to "36" and the allowable Oct width is set to "2". Consequently, the highest note number is set to "60".

The lowest note number and the allowable Oct width are set to values that are considered to have a small sense of discomfort in hearing in the timbre of the sound production part. For example, since the bass sound is characterized by a low range, when it is possible to produce sound up to the high range, the bass sound likeness may be lost and the musicality may be impaired. Therefore, the lowest note number and the allowable Oct width are set such that the maximum pitch that can maintain the bass sound likeness is set to the highest note number.

Here, since a note number based on the key 2*a* is set as the note number in the Arp note memory 12*b*, a note number (note numbers 34 and 35 in FIG. 12) lower than the lowest note number and a note number (note numbers 61 and 62 in FIG. 12) higher than the highest note number may be set.

Therefore, in the key range processing, the highest note number is set from the lowest note number and the allowable Oct width of the sound production part in the setting table 11*e*, and if the note number in the Arp note memory 12*b* is not between the lowest note number and the highest note number, a sound range is corrected by adding or subtracting the number of notes in one octave unit to or from the note number in the Arp note memory 12*b*.

For example, in a case where "34" lower than the lowest note number "36" is input as the note number in the Arp note memory 12*b*, the number of notes (that is, "12") corresponding to one octave is added, and thus, the note number is corrected to "46", and in a case where "60" that is equal to or higher than the highest note number "60" is input, the number of notes corresponding to one octave is subtracted, and thus the note number is corrected to "48". As described above, the note number in the Arp note memory 12*b* is corrected in a sound range between the lowest note number and the highest note number, and can be used as a sound production range in the timbre of the sound production part, and thus an arpeggio based on sound more like an instrument having that timbre can be output.

Since the note number in the Arp note memory 12*b* is added or subtracted in Oct units during the sound range correction, pitch names corresponding to the note numbers in the Arp note memory 12*b* before and after the correction are the same. Consequently, even in a case where a chord with a plurality of sounds is output in the arpeggio of the sound production part, the pitch name is not changed by the sound range correction, and thus the arpeggio can be output without breaking the harmony of chords.

In this case, in a case where the allowable Oct width is set to 2 or more and there are a plurality of sounds having the same pitch name in a sound production range, the note number in the Arp note memory 12*b* is corrected to a note number closest to the note number and having the same pitch name. As an example in FIG. 12, since the allowable Oct width in FIG. 12 is "2", in a case where the note number in the Arp note memory 12*b* is lower than the lowest note number, a sound range is corrected to a note number of the same pitch name belonging to the lower octave of the two octaves. On the other hand, in a case where the note number in the Arp note memory 12*b* is higher than the highest note number, the sound range is corrected to a note number of the same pitch name belonging to the higher octave of the two octaves.

Consequently, it is possible to suppress an increase in a difference between a note number before the sound range correction and a note number after the sound range correction and thus to suppress an output arpeggio from being unnatural.

FIG. 7 will be referred to again. After the key range processing in S78, an initial velocity of the sound production part in the setting table 11*e* is acquired and set in the velocity memory 12*c* (S79). After the process in S79, velocity duck processing (S80) is executed. Here, the velocity duck processing will be described with reference to FIG. 10.

Figure 10:
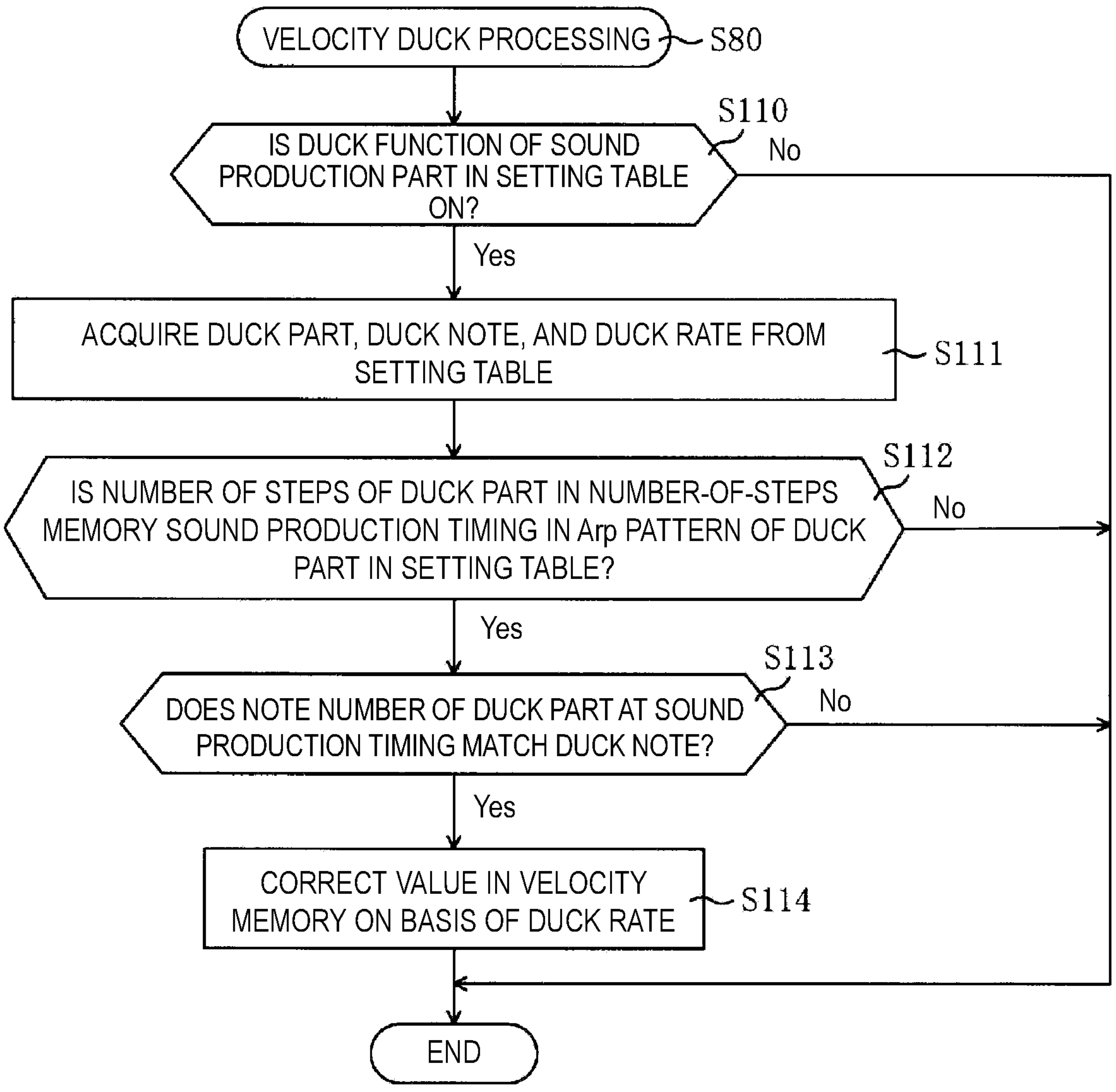
FIG. 10 is a flowchart illustrating velocity duck processing.

FIG. 10 is a flowchart illustrating the velocity duck processing. The velocity duck processing is a process of correcting a velocity in the velocity memory 12*c* to be reduced on the basis of on the duck part, the duck note, and the duck rate of the sound production part in the setting table 11*e*.

In the velocity duck processing, first, it is checked whether the duck function of the sound production part in the setting table 11*e* is ON (S110). In the process in S110, in a case where the duck function of the sound production part is ON (S110: Yes), the duck part, the duck note, and the duck rate of the sound production part are acquired from the setting table 11*e* (S11). After the process in S111, it is checked whether the number of steps of the duck part in the number-of-steps memory 12*f* is a sound production timing in the Arp pattern of the duck part in the setting table 11*e* (S112).

In the process in S112, in a case where the number of steps of the duck part is the sound production timing in the Arp pattern of the duck part (S112: Yes), it is checked whether a note number of the duck part at the sound production timing matches the duck note (S113). In a case where "ANY" is set for the duck note, it is determined that a note number matches the duck note in the process in S113 regardless of the note number of the duck part.

In the process in S113, in a case where the note number of the duck part at the sound production timing matches the duck note, the velocity in the velocity memory 12*c* is corrected on the basis of the duck rate (S114). Specifically, assuming that a velocity before correction is indicated by V and the duck rate is indicated by Ra, a velocity V' after correction is calculated by the following Equation 1.

$$V'=(100-Ra)\times V/100 \quad (1)$$

That is, a value obtained by subtracting the duck rate from 100 is multiplied by the velocity before correction, and a value obtained by dividing the obtained value by 100 is defined as the velocity after correction.

In the process in S113, in a case where the note number of the duck part at the sound production timing does not match the duck note (S113: No), the process in S114 is skipped. In a case where the number of steps of the duck part is not the sound production timing in the Arp pattern of the duck part in S112 (S112: No), the processes in S113 and S114 are skipped. In a case where the duck function of the sound production part is OFF in the process in S110 (S110: No), the processes in S111 to S114 are skipped. After the processes in S110 and S112 to S114, the velocity duck processing is finished, and the process returns to the arpeggio processing in FIG. 7.

Here, the duck function will be described with reference to FIG. 13. (a), (b), and (c) of FIG. 13 are diagrams respectively illustrating sound production timings of the drum part, the rhythm part, and the bass part, and (d), (e), and (f) of FIG. 13 are diagrams respectively illustrating velocities at the sound production timings of the drum part, the rhythm part, and the bass part.

In (a) of FIG. 13, note numbers 50 and 60 are assigned to the drum part, the number of steps per bar is set to 2, and the number of steps of 0 is set for the note number 50 as a sound production timing, and the number of steps of 1 is set for the note number 60 as a sound production timing. The velocity of the drum part is set to 100, and the duck function is set to OFF.

In (b) of FIG. 13, note numbers 60, 65, 69 are assigned to the rhythm part, the number of steps per bar is set to 4, and the number of steps of 2 is set for the note number 60 as a sound production timing, the number of steps of 0 to 3 is set for the note number 65 as sound production timings, and the number of steps of 3 is set for the note number 69 as a sound production timing. The velocity of the rhythm part is set to 100, the duck function is set to ON, the duck part is set to the drum part in (a) of FIG. 13, the duck note is set to 50, and the duck rate is set to 50.

(c) of In FIG. 13, note numbers 58, 71, and 72 are assigned to the bass part, the number of steps per bar is set to 8, the number of steps of 0 to 2 is set for the note number 58 as sound production timings, the number of steps of 3 to 5 is set for the note number 71 as sound production timings, and the number of steps of 6 and 7 is set for the note number 72 as sound production timings. The velocity of the bass part is set to 100, the duck function is set to ON, the duck part is set to the drum part in (a) of FIG. 13, the duck note is set to "ANY", and the duck rate is set to 100.

Since the drum part in (d) of FIG. 13 has the duck function set to OFF, sound is produced at the velocity of 100 at all sound production timings. On the other hand, in the rhythm part in (e) of FIG. 13, the number of steps of 0 that is a sound production timing of the note number 65, matches the number of steps of 0 that is a sound production timing of the drum part, and the note number of the drum part is 50 which matches the duck note of the rhythm part. Therefore, in the rhythm part in (e) of FIG. 13, the velocity of the note number 65 having the number of steps of 0 is reduced from 100 to 50 on the basis of Equation 1.

Similarly, in the bass part in (f) of FIG. 13, the number of steps of 0 that is a sound production timing of the note number 58 and the number of steps of 4 that is a sound production timing of the note number 71 respectively match the number of steps of 0 and 1 that are sound production timings of the drum part. Here, in the duck note of the bass part, "ANY" is set so that all note numbers are ducking targets. Therefore, in the bass part in (e) of FIG. 13, the velocity of the note number 58 having the number of steps of 0 and the velocity of the note number 71 having the number of steps of 4 are reduced from 100 to 0 based on Equation 1.

As described above, in the velocity duck processing, in a case where a sound production timing of the sound production part matches a sound production timing of the duck part, and a note number at the sound production timing of the duck part matches a duck note, the velocity in the velocity memory 12*c* is reduced according to the duck rate. Consequently, even in a case where a plurality of parts is sounded at the same time, an increase in an output level is suppressed, and thus output sound can be suppressed from becoming muddy.

The duck part can be set for each part, a note number of which the velocity in the velocity memory 12*c* is reduced can be designated by the duck note, and the degree of reducing the velocity can be designated by the duck rate. Consequently, a part in which the velocity in the velocity memory 12*c* is reduced, a note number in the part, and the degree of reducing the velocity can be set in detail, and thus the muddiness of output sound can be suppressed more effectively.

FIG. 7 will be referred to again. After the velocity duck processing in S80, an arpeggio is output by outputting a sound production instruction to the sound source 13 on the basis of the timbre of the sound production part in the setting table 11*e*, the note number in the Arp note memory 12*b*, and the velocity in the velocity memory 12*c* (S81).

In the process in S73, in a case where there is no sound production part (S73: No), the processes in S74 to S81 are skipped. After the processes in S73 and S81, a step update process (S82) is executed. Here, the step update process will be described with reference to FIG. 11.

Figure 11:
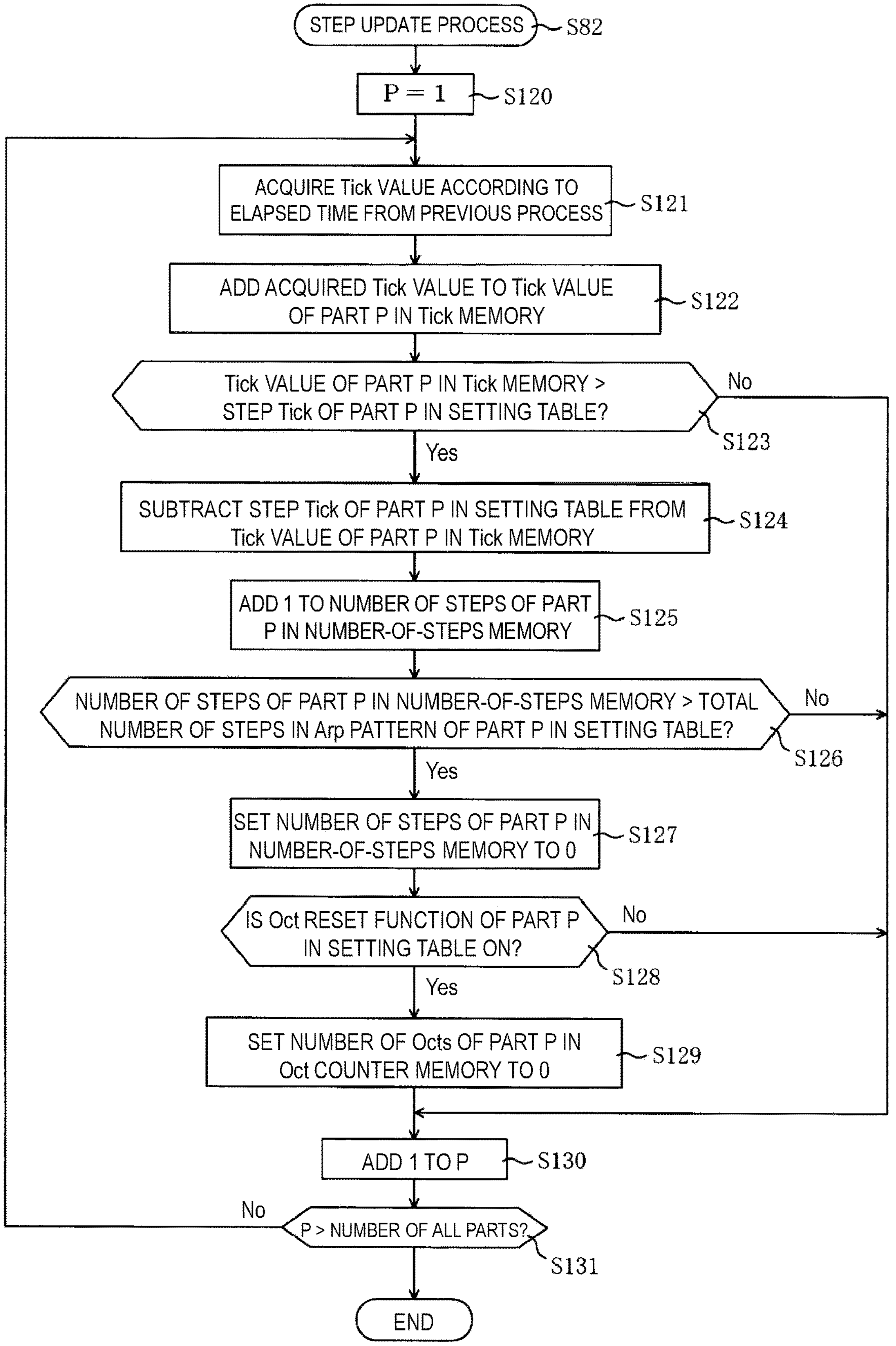
FIG. 11 is a flowchart illustrating a step update process.

FIG. 11 is a flowchart illustrating the step update process. The step update process is a process of updating the number of steps of each part in the number-of-steps memory 12*f* on the basis of the elapsed time from execution of the previous step update process.

In the step update process, first, 1 is set for a part number P (S120). For convenience, a part number is assigned to each part. Specifically, a part number 1 is assigned to the rhythm part, a part number 2 is assigned to the bass part, and a part number 3 is assigned to the drum part. Therefore, in a case where the part number P is "1", this represents the rhythm part, in a case where the part number P is "2", this represents the bass part, and in a case where the part number P is "3", this represents the drum part. Hereinafter, a "part corresponding to the part number P" is simply will be referred to as a "part P".

After the process in S120, a Tick value according to the elapsed time from the previous step update process is acquired (S121). As described above, since the required time per Tick is set to 1 msec in the present embodiment, a value obtained by dividing the elapsed time from the previous step update process by 1 msec is acquired.

After the process in S121, the Tick value acquired in the process in S122 is added to the Tick value of the part P in the Tick memory 12*e* (S122). After the process in S122, it is checked whether the Tick value of the part P in the Tick memory 12*e* is greater than the step Tick of the part P in the setting table 11*e* (S123).

In the process in S123, in a case where the Tick value of the part P is greater than the step Tick of the part P (S123: Yes), since a timing to update the number of steps in the part P arrives, the step Tick of the part P in the setting table 11*e* is subtracted from the Tick value of the part P in the Tick memory 12*e* (S124), and 1 is added to the number of steps of the part P in the number-of-steps memory 12*f* (S125).

After the process in S125, it is checked whether the number of steps of the part P in the number-of-steps memory 12*f* is larger than a total number of steps in the Arp pattern of the part P in the setting table 11*e* (S126). In the process in S126, in a case where the number of steps of the part P is larger than the total number of steps in the Arp pattern of the part P (S126: Yes), since the number of steps of the part P reaches the number of steps at the end of the Arp pattern of the part P and arpeggio output for one bar is completed, the number of steps of the part P in the number-of-steps memory 12*f* is set to 0 in preparation for arpeggio output for the next bar (S127).

After the process in S127, it is checked whether the Oct reset function of the part P in the setting table 11*e* is ON (S128). In the process in S128, in a case where the Oct reset function of the part P is ON (S128: Yes), the number of Octs of the part P in the Oct counter memory 12*d* is set to 0 (S129). Consequently, at the next number of steps in the part P of which the Oct shift function is ON, that is, at a sound production timing corresponding to the beginning of the next bar, the note number returns to the first note number in the remain table of the part P, and an arpeggio is output by the note number.

Figure 14:
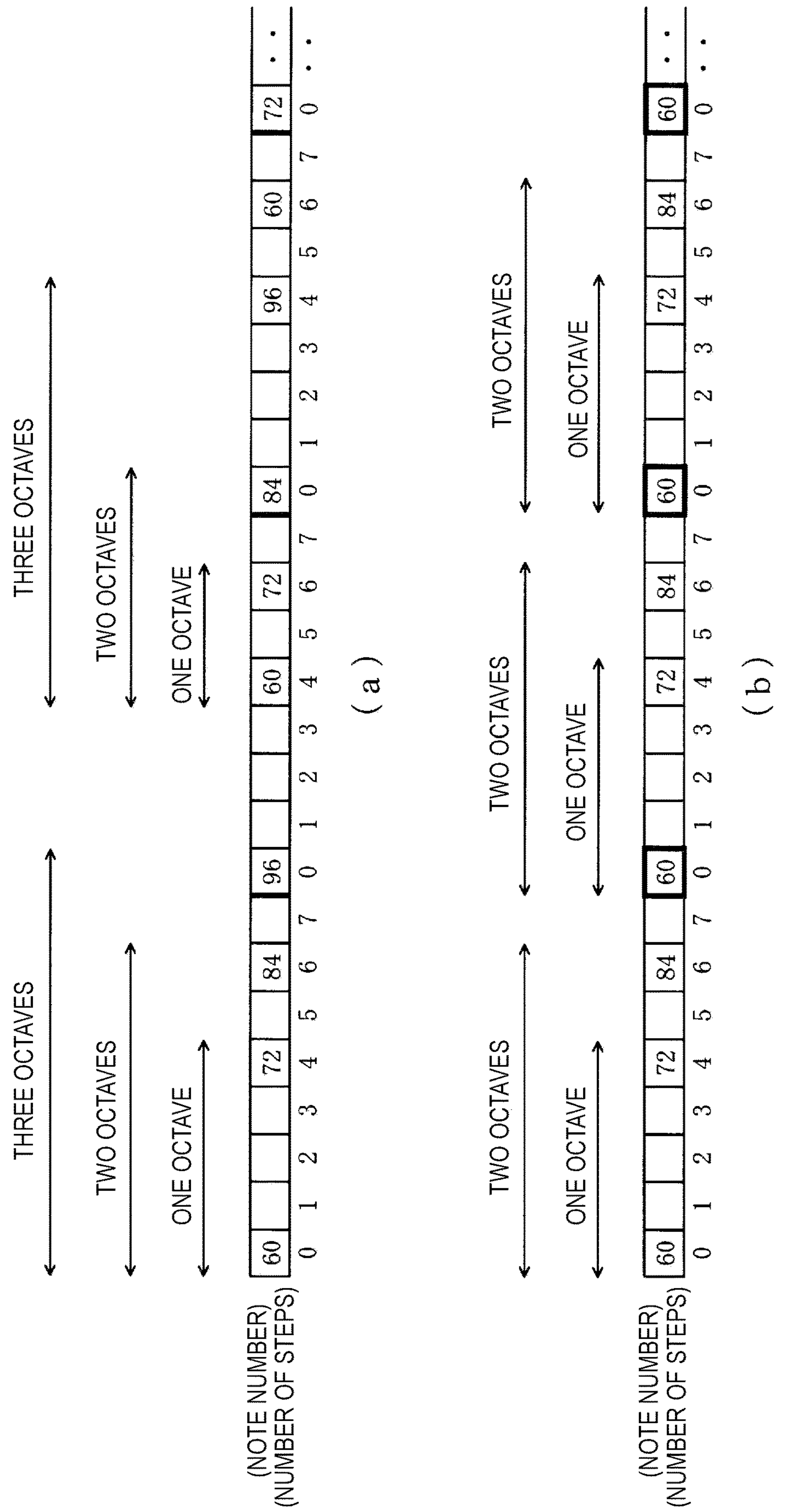

Here, the Oct reset function will be described with reference to FIG. 14. (a) of FIG. 14 is a diagram illustrating transition of a note number with respect to the number of steps in a case where the Oct reset function is OFF, and (b) of FIG. 14 is a diagram illustrating transition of the note number with respect to the number of steps in a case where the Oct reset function is ON. In both (a) and (b) of FIG. 14, an initial note number in the Oct shift function is set to 60, the Oct shift width is set to "3". As the ARP pattern, the number of steps of 0, 4, and 6 are set as sound production timings with respect to eight steps from 0 to 7.

As illustrated in (a) of FIG. 14, in a case where the Oct reset function is OFF, the initial note number 60 is increased by one octave to produce sound, and after the initial note number is increased by three octaves, the note number is returned to the initial note number 60. Therefore, a sound having the note number 60 at the number of steps of 0 in the first bar, a sound having the note number 72 at the number of steps of 4, a sound having the note number 84 at the number of steps of 6, and a sound having the note number 94 at the number of steps of 0 in the second bar are produced, and the sound having the note number 60 at the number of steps 4 in the second bar is produced. That is, sounds having different pitches are produced at the number of steps of 0 in the first bar and the number of steps of 0 in the second bar.

This is because the Arp pattern and the Oct shift width in the Oct shift function are set independently in the setting table 11*e* (refer to (c) of FIG. 3), and thus the number of sound production timings in the Arp pattern and the Oct shift width are not always the same. In this case, since sounds having different pitches are output at the beginning of the Arp pattern, that is, at the beginning of each bar, there is a discrepancy between a cycle based on the sound production timing of the Arp pattern that is repeated every bar and a cycle based on a change in pitch due to the Oct shift function such that an unnatural arpeggio is output, and thus there is concern that a listener may feel a sense of discomfort.

On the other hand, in a case where the Oct reset function is ON in (b) of FIG. 14, the number of Octs in the Oct counter memory 12*d* returns to 0 at the beginning of each bar, and thus all sounds to be produced at the beginning of each bar, that is, at the number of steps of 0, return to the note number 60. Consequently, the cycle based on the sound production timing of the Arp pattern for each bar can be synchronized with the cycle based on the change in pitch, and thus a listener can be given the impression that a certain phrase is being played.

FIG. 11 will be referred to again. In a case where the Oct reset function of the part P is OFF in the process in S128 (S128: No), the process in S129 is skipped and in a case where the number of steps of the part P is equal to or smaller than the total number of steps of the Arp pattern of the part P in the process in S126 (S126: No), the processes in S127 to S129 are skipped. In a case where the Tick value of the part P is equal to or smaller than the step Tick of the part Pin the process in S123 (S123: No), the processes in S124 to S129 are skipped.

After the processes in S123, S126, S128, and S129, 1 is added to the part number P (S130), and it is checked whether the part number P obtained as a result of the addition is larger than the total number of parts, that is, "three" (S131). In a case where the part number P is equal to or smaller than the total number of parts (S131: No), there is a part in which the number of steps is not backward, and thus the processes in and after S121 are repeatedly performed. On the other hand, in a case where the part number P is larger than the total number of parts (S131: Yes), the step update process is finished and the process returns to the arpeggio process in FIG. 7. After the step update process in S82, the arpeggio processing is finished.

Although the above description has been made on the basis of the above embodiment, it can be easily inferred that various improvements and changes are possible.

In the above embodiment, an output arpeggio part is divided into three parts, that is, the rhythm part, the bass part, and the drum part, but the number of arpeggio parts is not limited to three, and may be three parts or less, or three or more parts.

In the above embodiment, sound production timings for one bar are stored in the Arp pattern. However, the present invention is not limited to this, and sound production timings in units of two bars or four or more bars may be stored in the Arp pattern.

In the above embodiment, the time used for determining whether the key press mode is chord or single is set to 30 msec, but the time is not limited to this, and may be 30 msec or more or 30 msec or less. In particular, in a case where "chord" is to be prioritized as the key press mode, the time may be more than 30 msec, and in a case where "single" is to be prioritized, the time may be less than 30 msec.

In the above embodiment, in a case where the key press mode is single, the note numbers in the remain table are assigned to the note numbers in the Arp pattern in the order of the note numbers stored in the remain table. However, the present invention is not limited to this, and note numbers in the reverse order of the order stored in the remain table may be assigned to the note numbers in the Arp pattern. The note numbers in the remain table may be assigned to the note numbers in the Arp pattern in the order of pitch. In this case, the order of pitches assigned to the note numbers in the Arp pattern may be ascending order or descending order.

In the above embodiment, a velocity of each part is stored in an initial velocity in the setting table 11*e*, and an arpeggio is output on the basis of a velocity corrected through the velocity duck processing in FIG. 10. However, a value of the velocity used for the arpeggio output is not limited to the initial velocity in the setting table 11*e*, and for example, a velocity that is input to the key 2*a* by a performer may be used.

In the above embodiment, one part is stored as the duck part stored in the setting table 11*e*, but the number of stored duck parts is not limited to one, and two or more parts may be stored, or all other than the own part may be stored. As the duck note stored in the setting table 11*e*, one note number or "ANY" representing all note numbers is stored, but the duck note to be stored is not limited to these, and two or more specific note numbers may be stored.

In the above embodiment, a rate of change is stored as the duck rate stored in the setting table 11*e*, but is not limited to this. A fixed value for reducing the initial velocity may be stored, and the velocity in the velocity memory 12*c* may be corrected by subtracting the initial velocity from the velocity in the velocity memory 12*c*, for example.

In the above embodiment, the lowest note number and the allowable Oct width are stored in the setting table 11*e*, and the highest note number used in the sound range correction (S103 to S106) in the key range processing in FIG. 9 is calculated on the basis of the lowest note number and the allowable Oct width in the setting table 11*e*. However, the present invention is not limited to this, and the highest note number may be stored in the setting table 11*e* instead of the allowable Oct width, and the sound range correction may be performed on the basis of the lowest note number and the highest note number in the setting table 11*e*.

Alternatively, the highest note number may be stored in the setting table 11*e* instead of the lowest note number, the lowest note number may be calculated by subtracting the number of notes corresponding to the allowable Oct width from the highest note number, and the sound range correction may be performed on the basis of the calculated lowest note number and the highest note number in the setting table 11*e*.

In the sound range correction in the key range processing illustrated in FIG. 9, the number of notes for one octave is added or subtracted to or from the Arp note memory 12*b*. However, the present invention is not limited to this, and the number of notes for two or more octaves may be added or subtracted to or from the Arp note memory 12*b*.

In the key range processing in FIG. 9, in a case where the note number in the Arp note memory 12*b* is lower than the lowest note number (S103) or higher than the highest note number (S105), the sound range correction is performed (S104 and S106). However, a condition for correcting a sound range is not limited to this, and the sound range correction may be performed in a case where the note number in the Arp note memory 12*b* is equal to or lower than the lowest note number or higher than the highest note number.

In the above embodiment, the note number in the Arp note memory 12*b* is increased in the Oct shift process in FIG. 8. However, the present invention is not limited to this, and the note number in the Arp note memory 12*b* may be lowered. Although the note number in the Arp note memory 12*b* is increased by one octave, the note number in the Arp note memory 12*b* is not limited to being increased by one octave, and may be increased by two or more octaves. The unit for increasing the note number in the Arp note memory 12*b* is not limited to the Oct unit, and may be increased in musically cohesive units such as a predetermined number of scales.

In the above embodiment, the synthesizer 1 is exemplified as an electronic musical instrument. However, the present invention is not limited to this, and may be applied to an arpeggiator having only an arpeggiator function and other electronic musical instruments such as an electronic organ, an electronic piano, and an electronic wind instrument.

In the above embodiment, the control program 11*a* is stored in the flash ROM 11 of the synthesizer 1 and operated on the synthesizer 1. However, the present invention is not limited to this, and the control program 11*a* may be operated on another computer such as a personal computer (PC), a mobile phone, a smartphone, or a tablet terminal. In this case, instead of the keyboard 2 of the synthesizer 1, performance information may be input from a MIDI standard keyboard or a keyboard for character input connected to a PC or the like by wire or wirelessly, or the performance information may be input from a software keyboard displayed on a display device of the PC or the like.

The invention claimed is:

1. An arpeggiator that includes automatic performance part having an arpeggio pattern in which sound production timings of arpeggio constituent sounds are stored and for automatically playing an arpeggio by performing sound production based on a note number input by a performer at a sound production timing in the arpeggio pattern, the arpeggiator comprising:

a sound range designation part for designating an output sound range of a performance part; and a sound range correction part for, in a case where the note number input by the performer is not within the sound range designated by the sound range designation part, correcting the note number to a note number within the sound range, wherein the automatic performance part automatically plays the arpeggio by performing sound production based on the note number subjected to sound range correction by the sound range correction part at the sound production timing stored in the arpeggio pattern, wherein, in a case where the note number input by the performer is not within the sound range designated by the sound range designation part, the sound range correction part performs sound range correction by adding or subtracting a number of note numbers corresponding to n which is a natural number octaves to or from the note number such that the note number comes within the sound range, and wherein in a case where there are two or more possible note numbers that are note numbers after the addition or the subtraction and are within the sound range designated by the sound range designation part, the sound range correction part performs the sound range correction such that the note number input by the performer is corrected to a single closest note number among the two or more possible note numbers.

2. The arpeggiator according to claim 1, further comprising:

a plurality of performance parts configured to automatically play the arpeggio, wherein, in a performance part having the sound range designation part and the sound range correction part among the performance parts configured to automatically play the arpeggio, the automatic performance part automatically plays the arpeggio on the basis of the sound range designation part and the sound range correction part of the performance part.

3. A recording medium, which is computer-readable and records a program provided with an arpeggiator function of causing a computer having a storage portion to automatically play an arpeggio by performing sound production based on a note number input by a performer at a sound production timing in an arpeggio pattern, the storage portion functioning as storage part for storing the arpeggio pattern in which sound production timings of arpeggio constituent sounds are stored and sound range designation part for designating an output sound range of a performance part, the program provided with an arpeggiator function causing the computer to execute:

a sound range correction step of, in a case where the note number input by the performer is not within the sound range designated by the sound range designation part, correcting the note number to a note number within the sound range; and a sound production step of performing sound production based on the note number subjected to sound range correction in the sound range correction step at the sound production timing stored in the arpeggio pattern, wherein, in a case where the note number input by the performer is not within the sound range designated by the sound range designation part, the sound range correction step performs sound range correction by adding or subtracting a number of note numbers corresponding to n which is a natural number octaves to or from the note number such that the note number comes within the sound range, and wherein, in a case where there are two or more possible note numbers that are note numbers after the addition or the subtraction and are within the sound range designated by the sound range designation part, the sound range correction step performs the sound range correction such that the note number input by the performer is corrected to a single closest note number among the two or more possible note numbers.

4. The recording medium according to claim 3, further comprising:

a plurality of performance parts configured to automatically play the arpeggio, wherein, in a performance part having the sound range designation part and the sound range correction step among the performance parts configured to automatically play the arpeggio, the automatic performance part automatically plays the arpeggio on the basis of the sound range designation part and the sound range correction step of the performance part.

5. A method of making an arpeggio using an arpeggiator that includes automatic performance part having an arpeggio pattern in which sound production timings of arpeggio constituent sounds are stored and for automatically playing an arpeggio by performing sound production based on a note number input by a performer at a sound production timing in the arpeggio pattern, the arpeggiator further comprising sound range designation part for designating an output sound range of a performance part, and the method of making the arpeggio comprising:

a sound range correction step of, in a case where the note number input by the performer is not within the sound range designated by the sound range designation part, correcting the note number to a note number within the sound range; and a sound production step of performing sound production based on the note number subjected to sound range correction in the sound range correction step at the sound production timing stored in the arpeggio pattern, wherein, in a case where the note number input by the performer is not within the sound range designated by the sound range designation part, the sound range correction step performs sound range correction by adding or subtracting a number of note numbers corresponding to n which is a natural number octaves to or from the note number such that the note number comes within the sound range, and wherein, in a case where there are two or more possible note numbers that are note numbers after the addition or the subtraction and are within the sound range designated by the sound range designation part, the sound range correction step performs the sound range correction such that the note number input by the performer is corrected to a single closest note number among the two or more possible note numbers.

6. The method of making the arpeggio according to claim 5, further comprising:

a plurality of performance parts configured to automatically play the arpeggio, wherein, in a performance part having the sound range designation part and the sound range correction step among the performance parts configured to automatically play the arpeggio, the automatic performance part automatically plays the arpeggio on the basis of the sound range designation part and the sound range correction step of the performance part.

7. The method of making the arpeggio according to claim 5, wherein the arpeggiator further comprising storage portion for storing the arpeggio pattern.

8. The arpeggiator according to claim 1, further comprising:

storage portion for storing the arpeggio pattern.

* * * * *